(12) United States Patent
Hou

(10) Patent No.: US 7,720,619 B2
(45) Date of Patent: May 18, 2010

(54) SYSTEMS AND METHODS FOR DETECTING HIGH-IMPEDANCE FAULTS IN A MULTI-GROUNDED POWER DISTRIBUTION SYSTEM

(75) Inventor: Daqing Hou, Boise, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 66 days.

(21) Appl. No.: 11/499,620

(22) Filed: Aug. 4, 2006

(65) Prior Publication Data

US 2008/0030199 A1 Feb. 7, 2008

(51) Int. Cl.
*G01R 31/00* (2006.01)
(52) U.S. Cl. .................................................. 702/58
(58) Field of Classification Search ............... 702/57, 702/58, 60, 69, 70, 75, 146, 182, 183, 185, 702/191, 193; 324/522; 700/293; 361/93.6
See application file for complete search history.

(56) References Cited

U.S. PATENT DOCUMENTS

| 4,138,664 | A | 2/1979 | Conforti et al. |
|---|---|---|---|
| 4,297,738 | A | 10/1981 | Lee |
| 4,297,740 | A | 10/1981 | Hagberg |
| 4,313,146 | A | 1/1982 | Lee |
| 4,347,542 | A | 8/1982 | Calhoun |
| 4,357,644 | A | 11/1982 | Schmidt |
| 4,367,422 | A | 1/1983 | Leslie |
| 4,402,028 | A | 8/1983 | Udren |
| 4,466,071 | A | 8/1984 | Russell |
| 4,562,550 | A | 12/1985 | Beatty et al. |
| 4,728,866 | A | 3/1988 | Capewell et al. |
| 4,736,432 | A | 4/1988 | Cantrell |
| 4,811,210 | A | 3/1989 | McAulay |
| 4,851,782 | A | 7/1989 | Jeerings et al. |
| 4,871,971 | A | 10/1989 | Jeerings et al. |
| 4,878,142 | A | 10/1989 | Bergman et al. |

(Continued)

FOREIGN PATENT DOCUMENTS

WO WO 0122104 3/2001

(Continued)

OTHER PUBLICATIONS

PP&L Report of Distribution Conductor Staged Fault Tests held on Oct. 3-4, 1973.

(Continued)

*Primary Examiner*—Mohamed Charioui
(74) *Attorney, Agent, or Firm*—Eugene M. Cummings, P.C.

(57) ABSTRACT

The apparatus and methods calculate a plurality of sum of differences for a power distribution system quantity with a sum of difference filter, provide a set of predetermined blocking conditions, provide a trending and memory with an output, generate a set threshold with an adaptive tuning algorithm; establish a reference based upon the plurality of power distribution quantities differences from the one-cycle difference filter and the set threshold, calculate a ratio of the difference between the plurality of sum of differences from the sum of difference filter and the reference, memorize a time and form a trend output if the ratio of the difference exceeds the set threshold, and determine the existence of a high-impedance fault with decision logic based on the trend output and the set of predetermined blocking conditions.

37 Claims, 13 Drawing Sheets

U.S. PATENT DOCUMENTS

| | | | |
|---|---|---|---|
| 4,939,516 | A | 7/1990 | Early |
| 5,139,745 | A | 8/1992 | Barr |
| 5,341,265 | A | 8/1994 | Westrom et al. |
| 5,452,223 | A * | 9/1995 | Zuercher et al. ............ 702/58 |
| 5,475,556 | A | 12/1995 | Yoon et al. |
| 5,485,093 | A | 1/1996 | Russell et al. |
| 5,506,789 | A * | 4/1996 | Russell et al. ............. 702/58 |
| 5,512,832 | A | 4/1996 | Russell et al. |
| 5,521,946 | A | 5/1996 | Main |
| 5,537,327 | A | 7/1996 | Snow et al. |
| 5,550,751 | A | 8/1996 | Russell |
| 5,561,605 | A * | 10/1996 | Zuercher et al. ............ 702/64 |
| 5,578,931 | A | 11/1996 | Russell et al. |
| 5,600,526 | A | 2/1997 | Russell et al. |
| 5,602,709 | A | 2/1997 | Al-Dabbagh |
| 5,659,453 | A | 8/1997 | Russell et al. |
| 5,724,247 | A | 3/1998 | Dalstein |
| 5,734,575 | A | 3/1998 | Snow et al. |
| 5,787,126 | A | 7/1998 | Itoh et al. |
| 5,835,321 | A | 11/1998 | Elms et al. |
| 5,847,913 | A | 12/1998 | Turner |
| 5,896,302 | A | 4/1999 | Goodpaster |
| 6,002,561 | A | 12/1999 | Dougherty |
| 6,058,353 | A | 5/2000 | Goodpaster |
| 6,195,241 | B1 | 2/2001 | Brooks |
| 6,292,340 | B1 | 9/2001 | O'Regan et al. |
| 6,414,829 | B1 | 7/2002 | Haun |
| 6,453,248 | B1 | 9/2002 | Hart et al. |
| 6,459,998 | B1 | 10/2002 | Hoffman |
| 6,483,680 | B1 | 11/2002 | Kulidjian et al. |
| 6,812,715 | B2 | 11/2004 | Chiozzi et al. |
| 6,829,544 | B1 | 12/2004 | Kasztenny et al. |
| 6,934,654 | B2 | 8/2005 | Benmouyal |
| 6,998,848 | B2 | 2/2006 | Kereit |
| 7,072,427 | B2 | 7/2006 | Rawlins |
| 2003/0085715 | A1 | 5/2003 | Lubkeman |
| 2003/0146776 | A1 | 8/2003 | Nakase |
| 2004/0120090 | A1 | 6/2004 | Galli et al. |
| 2005/0171647 | A1 | 8/2005 | Kunsman et al. |
| 2005/0212524 | A1 | 9/2005 | Ennis et al. |
| 2005/0231862 | A1 | 10/2005 | Peterson et al. |
| 2006/0085146 | A1 | 4/2006 | Peterson et al. |
| 2006/0215335 | A1 | 9/2006 | Deshpande |

FOREIGN PATENT DOCUMENTS

| | | | |
|---|---|---|---|
| WO | WO 06044354 | A1 | 4/2006 |

OTHER PUBLICATIONS

PP&L Report of Distribution Fault Interruption, Open Conductor Tests, Oct. 20, 1975.

"The Interruption of Downed Conductors on Low-Voltage Distribution Systems," Report of IEEE PSCR Working Group of The Parameters of Distribution Ground Fault Protection, Oct. 1976.

J. Carr, G.L. Hood, "High Impedance Fault Detection on Primary Distribution Systems," CEA Final Report, Project No. 78-75, Nov. 1979 (Carr Engineering Limited).

I. Lee, "High Impedance Fault Detection Using Third Harmonic Current," EPRI Final Report, EPRI EL-2430, Jun. 1982 (Hughes Aircraft Company).

S.J. Balser, K.A. Clements, E. Kallaur, "Detection of High Impedance Faults," EPRI Final Report, EPRI EL-2413, Jun. 1982 (Power Technologies, Inc.).

B.D. Russell, B.M. Aucoin, T.J. Talley, "Detection of Arcing Faults on Distribution Feeders." EPRI Final Report, EPRI EL-2757, Dec. 1982 (Texas A&M University).

J. Carr, "High Impedance Fault Detection on Multi-Grounded Primary Distribution Feeders," Update of CEA Project No. 78-75, Feb. 1984 (Amicus Engineering Corporation).

S.J. Balser, D.J. Lawrence, B. Caprino, L. Delaney, "Implementation of a High Impedance Fault Detection Algorithm," EPRI Final Report, EPRI EL-4022, May 1985 (Power Technologies, Inc.).

"Downed Power Lines: Why They Can't Always be Detected," IEEE Power Engineering Society, Feb. 1989.

"Detection of Downed Conductors on Utility Distribution Systems," IEEE PES Tutorial Course, 90EH0310-3-PWR 1989 (Texas A&M University).

Panel Session Summary at 1995 PES Summer Meeting, "Application of High Impedance Fault Detectors".

Vern L. Buchholz, "The Characterization of High Impedance Faults," CEA Report 038 D 721, 1992.

Mukesh Nagpal, "Testing of High-Impedance Fault Relays," CEA Report 038 D 1000. 1995.

Mukesh Nagpal, "Evaluation of GE High Impedance Relays," CEA Report T984700-5002, 1999.

Mark Adamiak, Craig Wester, Manish Thakur, Chuck Jensen, "High Impedance Fault Detection on Distribution Feeders," http://pm.geindustrial.com/FAQ/Documents/F60/HizFeeder.pdf, (revised 2004).

Craig Wester, "High Impedance Fault Detection on Distribution Systems," http://pm.geindustrial.com/FAQ/Documents/F60/GER-3993.pdf (revised 2002).

John Tengdin, et al., "High Impedance Fault Detection Technology," Report of PSRC Working Group D15, Mar. 1, 1996, http://pm.geindustrial.com/FAQ/Documents/F60,GER-3988.pdf (revised 2002).

Denise Deveau, "Circuit Protection—Detection of High Impedance Ground Faults," http://pm.geindustrial.com/FAQ/Documents/F60/GER-3980.pdf (revised 2002).

T.J. Talley, "Power Spectrum Estimates of High Frequency Noise Generated by High Impedance Arcing Faults on Distribution Systems," Master Thesis, Dec. 1979, Texas A&M University (Advisor: B.D. Russell).

C.L. Benner, "An Algorithm for Faulted Phase and Feeder Selection Under High Impedance Fault Conditions," Master Thesis, Aug. 1988, Texas A&M University (Advisor: B.D. Russell).

P.W. Carswell, "The Detection of High Impedance Faults Using Random Fault Behavior," Master Thesis, Aug. 1988, Texas A&M University (Advisor: D.B. Russell).

R.P. Chinchali, "A Parametric Digital Signal Processing Algorithm for Arcing High Impedance Fault Detection," Doctor Dissertation, Aug. 1998, Texas A&M University (Advisor: D.B. Russell).

S.D. Ebron, "Neural Network Processing Strategy for the Detection of HIgh Impedance Faults," Master Thesis, 1988, North Carolina State University (Advisor: D.L. Lubkeman).

Chang Jong Kim, "An Intelligence Decision-Making System for Detecting High Impedance Faults." Ph.D. Dissertation, Dec. 1989, Texas A&M University (Advisor: D.B. Russell).

M.A. Susith Rohana Fernando, "Spatio-Temporal Neural Networks in High Impedance Fault Detection," Ph.D. Dissertation, May 1994, Texas A&M University (Advisor Karen L Watson and D.B. Russell).

F.M. Uriarte, "Modeling, Detection, and Localization of High Impedance Faults in Low-Voltage Distribution Feeders," Master Thesis, Dec. 2003, Virginia Tech Polytechnic Institute and State University (Advisor: Virgilio Centeno).

J. Carr, "High Impedance and Broken Conductor Fault Detection on Primary Distribution Systems," Canadian Electrical Association 1979 Spring Meeting, Mar. 26-28, 1979, Vancouver, B.C.

L.A. Killar, M. Rosado, H.F. Farnsler, R.E. Lee, "Innovative Relay Methods for Detecting High Impedance Faults on Distribution Circuits," Proceedings of the American Power Conference, vol. 41, 1979, pp. 1180-1183.

M. Rosado, L.A. Killar, D.F. Shankle, R.E. Lee, "Improved Relay Schemes for the Detection of Fallen Conductors on Three-Phase, Four-Wire, Distribution Circuits," IEEE Paper presented at the 1979 IEEE/PES Conference & Exposition on Transmission and Distribution, Atlanta, Georgia, Apr. 1979.

R.E. Lee, L.A. Killar, "Summary and Status Report on Research to Detect and De-energize High Impedance Faults on Three-Phase, Four-Wire Distribution Circuit," IEEE Paper A 79 516-6, IEEE PES Summer Meeting, Vancouver, B.C. Jul. 1979.

R.F. Wolff, "It's Tough to Relay High Impedance Faults," Electrical World, vol. 192. No. 3. Aug. 1979, pp. 32-33.

R.E. Lee, D.E. Fritz, P.H. Stiller, L.A. Killar, D.F. Shankle, "Prevention of Covered Conductor Burndown on Distribution Circuits," Proceeding of American Power Conference, vol. 42, pp. 587-592, Apr. 1980.

H.J. Songster, "High Iimpedance Fault Detection," Western Relay Conference, Oct. 27-29, 1980, Spokane, WA.

P.S. Wessels, "Ground Fault Interruption Personnel Protection on the Overhead Electric Power Distribution Line," Hazard Prevention, Nov./Dec. 1980, pp. 9-15, 32.

J. Carr, "New Approach to High Impedance Faults," Electrical World, vol. 194, No. 9, Dec. 1980, p. 86.

H.L. Graham, A.J. Carlson, T.A. Granberg, "Broken Conductor and High Impedance Fault Detection by High Frequency Impedance Monitoring." IEEE/PES Winter Power Meeting. Paper No. A-80-064-6, Dec. 1980.

W.A. Elmore, "Application Considerations of Type CGR Broken Conductor Detection Relay," 1981 Electric Utility Engineering Conference, Mar. 22-Apr. 3, 1981.

J. Carr, "Detection of High Impedance Faults on Multi-Grounded Primary Distribution System," IEEE Transactions on Power Apparatus and Systems, vol. PAS-100, No. 4, Apr. 1981, pp. 2008-2016.

B.M. Aucoin, B.D. Russell, "Distribution High Impedance Fault Detection Utilizing High Frequency Current Components," IEEE Transactions on Power Apparatus and Systems, vol. PAS-101 No. 6, Jun. 1982, pp. 1596-1606 (IEEE PES 1981 Transmission and Distribution Conference and Exposition, Minneapolis, MN, Sep. 20-25, 1981, Paper 81-TD-603-0).

H. Calhoun, M.T. Bishop, C.H. Eichler, R.E. Lee, "Development and Testing of an Electro-Mechanical Relay to Detect Fallen Distribution Conductors," IEEE Transactions on Power Apparatus and Systems, vol. PAS-101, No. 6, Jun. 1982, pp. 1643-1648 (IEEE PES 1981 1981 Transmission and Distribution Conference and Exposition. Minneapolis, MN, Sep. 20-25, 1981, Paper 81-TD-613-9).

"High Impedance Fault Detection Remains Unsolved," Electric Light and Power, vol. 60, No. 10, Oct. 1992, p. 25.

R.E. Lee, M.T. Bishop, "Performance Testing of the Ratio Ground Relay on a Four-Wire Distribution Feeder," IEEE Transactions on Power Apparatus and Systems, vol. PAS-102, No. 9, Sep. 1983, pp. 2943-2949 (IEEE PES 1983 Winter Meeting, New York, NY, Jan. 30-Feb. 4.

B.M. Aucoin, "Status of High Impedance Fault Detection," IEEE Transactions on Power Apparatus and Systems, vol. PAS-104, No. 3, Mar. 1985, pp. 638-643 (IEEE PES 1984 Summer Meeting, Seattle, WA, Jul. 15-20).

M. Aucoin, J. Zeigler, B.D. Russell, "Feeder Protection and Monitoring System, Part 1: Design, Implementation and Testing," IEEE Transactions on Power Apparatus and Systems, vol. PAS-104, No. 4, Apr. 1985, pp. 873-880 (IEEE PES 1984 Summer Meeting, Seattle, WA, Jul. 15-20).

M. Aucoin, J. Zeigler, B.D. Russell, "Feeder Protection and Monitoring System, Part II: Staged Fault Test Demonstration," IEEE Transactions on Power Apparatus and Systems, vol. PAS-104, No. 6, Jun. 1985, pp. 1456-1462 (IEEE PES 1984 Summer Meeting, Seattle, WA, Jul. 15-20).

A.G. Phadke, H. Hankun, "Detection of Broken Distribution Conductors," Proceedings of IEEE Southeast Relay Conference, Raleigh, N. Carolina, Paper No. CH2161-8/85/0000-0074, Aug. 1985.

H.Y. Chu, M.T. Chen, C.L. Huang, S.S. Yen, "High Impedance Fault Tests on TaiPower Distribution System," from Ivan Sep. 17, 1985.

R.E. Lee, R.H. Osborn, "A Microcomputer Based Data Acquisition System for High Impedance Fault Analysis," IEEE Transactions on Power Apparatus and Systems, vol. PAS-104, No. 10, Oct. 1985, pp. 2748-2753 (IEEE PES 1985 Winter Meeting, New NY, Feb. 3-8).

R.E. Lee, M.T. Bishop, "A Comparison of Measured High Impedance Fault Data to Digital Computer Modeling Results," IEEE Transactions on Power Apparatus and Systems, vol. PAS-104, No. 10, Oct. 1985, pp. 2754-2758 (IEEE PES 1985 Winter Meeting, New York, NY, Feb. 3-8).

S.J. Basler, K.A. Clements, D.J. Lawrence, "A Microprocessor-Based Technique for Detection of High Impedance Faults," IEEE Transactions on Power Delivery, vol. PWRD-1, No. 3, Jul. 1986, pp. 252-258 (IEEE PES 1986 Winter Meeting, NY, NY, Feb. 2-7).

M. Aucoin, B.D. Russell, "Detection of Distribution High Impedance Faults Using Burst Noise Signals Near 60Hz," IEEE Transactions on Power Delivery, vol. PWRD-2, No. 2, Apr. 1987, pp. 342-348 (IEEE PES 1986 Transmission and Distribution Conference, Anaheim, CA, Sep. 14-19).

I. Reedy, "The Fallen Power Line Hazard: A New Approach to Protection," Publich Utility Fortnightly, vol. 120, No. 3, Aug. 6 1987.

M. Narendorf, B.D. Russell, M. Aucoin, "Microcomputer Based Feeder Protection and Monitoring System—Utility Experience," IEEE Transactions on Power and Delivery, vol. PWRD-2, No. 4, Oct. 1987, pp. 1046-1052 (IEEE PES 1987 Winter Meeting, New Orleans, LA, Feb. 1-6).

B.D. Russell, K. Watson, "Power Substation Automation Using a Knowledge Based System—Justification and Preliminary Field Experiments," IEEE Transactions on Power Delivery, vol. PWRD-2, No. 4, Oct. 1987, pp. 1090-1097 (IEEE PES 1986 Transmission and Distribution Conference, Anaheim, CA, Sep. 14-19).

C.J. Kim, B.D. Russell, "Harmonic Behavior During Arcing Faults on Power Distribution Feeders," Electric Power Systems Research, vol. 14, No. 3, Jun. 1988, pp. 219-225.

C.L. Huang, H.Y. Chu, M.T. Chen, "Algorithm Comparison for High Impedance Fault Detection Based on Staged Fault Tests," IEEE Transaction on Power Delivery, vol. PWRD-3, No. 4, Oct. 1988, pp. 1427-1435 (IEEE PES 1987 Summer Meeting, San Francisco, CA, Jul. 12-17).

B.D. Russell, R. P. Chinchali, C.J. Kim, "Behaviour of Low Frequency Spectra During Arcing Fault and Switching Events," IEEE Transactions on Power Delivery, vol. PWRD-3, No. 4, Oct. 1988, pp. 1485-1492 (IEEE PES 1987 Summer Meeting, San Francisco, CA, Jul. 12-17).

B.D. Russell, K. Mehta, R.P. Chinchali, "An Arcing Fault Detection Technique Using Low Frequency Current Components—Performance Evaluation Using Recorded Field Data," IEEE Transactions on Power Delivery, vol. PWRD-3, No. 4, Oct. 1988, pp. 1493-1500 (IEEE PES 1987 Summer Meeting, San Francisco, CA, Jul. 12-17).

B.D. Russell, R.P. Chinchali, "A Digital Signal Processing Algorithm for Detecting Arcing Faults on Power Distribution Feeders," IEEE Transactions on Power Delivery. vol. 4, No. 1, Jan. 1989, pp. 132-140 (IEEE PES 1988 Winter Meeting, New York, NY, Jan. 31-Feb. 5).

C. Benner, P. Carswell, B.D. Russell, "Improved Algorithm for Detecting Arcing Faults Using Random Fault Behavior," Electric Power System Research, vol. 17, No. 1, 1989, pp. 49-56.

M. Al-Dabbagh, R. Daoud, R. Coulter, "Improved Microprocessor Based Feeder Earth Fault Protection Using Pattern Recognition," Presented at the Fourth International Conference on Developments in Power System Protection, Edinburgh, UK, Apr. 11-13, 1989.

D.I. Jeerings, J.R. Linders, "Ground Resistance-Revisited," IEEE Transactions on Power Delivery, vol. PWRD-4, No. 2, Apr. 1989, pp. 949-956 (IEEE PES 1988 Summer Meeting, Portland, OR, Jul. 24-29).

C.J. Kim, B.D. Russell, "Classification of Faults and Switching Events by Inductive Reasoning and Expert System Methodology," IEEE Transactions on Power Delivery, vol. PWRD-4, No. 3, Jul. 1989, pp. 1631-1637 (IEEE PES 1989 Winter Meeting, New York, NY, Jan. 29-Feb. 3).

B.D. Russell, B.M. Aucoin, C. Benner, "Computer Relaying Techniques for the Detection of High Impedance Faults Using Signal Processing and Pattern Recognition Methods," International Conference on Power System Protection, Singapore, Sep. 1989.

R. M. Reedy, "Minimize the Public Risk of Downed Conductors," Electrical World, Sep. 1989, pp. S-36, 38, 40.

M. Aucoin, B.D. Russell, C.L. Benner, "High Impedance Fault Detection for Industrial Power Systems," IEEE Industrial Applications Society Conference, San Francisco, Oct. 1989.

A.E. Emanuel, S. Shiller, E.M. Gulachenski, "High Impedance Fault Arching on Sandy Soil in 15kV Distribution Feeders: Contributions to the Evaluation of the Low Frequency Spectrum," IEEE Transactions on Power Delivery, vol. PWRD-5, No. 2, Apr. 1990, pp. 676-686 (IEEE PES 1989 Summer Meeting, Long Beach, CA, Jul. 9-14).

S. Ebron, D.L. Lubkeman, M. White, "A Neural Network Approach to the Detection of Incipient Faults on Power Distribution Feeders," IEEE Transactions on Power Delivery, vol. PWRD-5, No. 2, Apr. 1990, pp. 905-914 (IEEE PES 1989 Transmission and Distribution Conference, New Orleans, LA, Apr. 2-7).

D.I. Jeerings, J.R. Linders, "Unique Aspects of Distribution System Harmonics Due to High Impedance Ground Faults," IEEE Transactions on Power Delivery, vol. PWRD-5, No. 2, Apr. 1990, pp. 1082-1092 (IEEE PES 1989 Transmission and Distribution Conference, New Orleans, LA, Apr. 2-7).

E.A. Atwell, A.W. Shaffer, D.I. Jeerings, J.R. Linders, "Performance Testing of the Nordon High Impedance Ground Fault Detector on a Distribution Feeder," 34th Rural Electric Power Conference IEEE/IAS Apr. 29-May 1, 1990, Orlando, FL.

W.H. Kwon, G.W. Lee, Y.M. Park, M.C. Yoon, M.H. Yoo, "High Impedance Fault Detection Utilizing Incremental Variance of Normalized Even Order Harmonic Power," IEEE/PES 1990 Summer Meeting, Minneapolis, Minnesota, Jul. 15-19, 1990.

C.J. Kim, B.D. Russell, K. Watson, "A Parameter-Based Process for Selecting High Impedance Fault Detection Techniques Using Decision Making Under Incomplete Knowledge," IEEE Transactions on Power Delivery, vol. PWRD-5, No. 3, Jul. 1990, pp. 1314-1320.

D.I. Jeerings, J.R. Linders, "A Practical Protective Relay For Down-Conductor Faults," IEEE Transactions on Power Delivery, vol. PWRD-6, No. 2, Apr. 1991, pp. 565-574 (IEEE PES 1990 Summer Meeting, Minneapolis, Minnesota, Jul. 15-19).

B.M. Aucoin, B.D. Russell, "Fallen Conductor Accidents: The Challenge to Improve Safety," Public Utilities Fortnightly, vol. 129, No. 3, Feb. 1, 1992, pp. 38-40.

C.J. Kim, B.D. Russell, "High-Impedance Fault Detection System Using An Adaptive Element Model," Generation, Transmission and Distribution, IEE Proceedings C. vol. 140, Issue 2, Mar. 1993, pp. 153-159.

R.D. Christie, H. Zadehgol, M.M. Habib, "High-Impedance Fault Detection In Low Voltage Networks," IEEE Transactions on Power Delivery, vol. PWRD-8, No. 4, Oct. 1993. pp. 1829-1836.

A.M. Sharaf, L.A. Snider, K. Debnath, "A Neutral Network Based Back Error Propagation Relay Algorithm For Distribution System High Impedance Fault Detection," 2nd International Conference on Advances in Power System Control, Operation and Management Management, Dec. 7-10, 1993, pp. 613-620.

A.P. Apostolov, J. Bronfeld, C.H.M. Saylor, P.B. Snow, "An Artificial Neural Network Approach to the Detection of High Impedance Faults," Proceedings of International Conference on Expert System Applications for the Electrical Power Industry, Phoenix, Arizona, Dec. 8-10, 1993.

A.F. Sultan, G.W. Swift, D.J. Fedirchuk, "Detecting Arcing Downed-Wires Using Fault Current Flicker and Half-Cycle Asymmetry," IEEE Transactions on Power Delivery, vol. PWRD-9, No. 1, Jan. 1994, pp. 461-470 (IEEE PES 1993 WInter Meeting, Columbus, OH, Jan. 31-Feb. 5).

R. Patterson, W. Tyska, B.D. Russell, B.M. Aucoin, "A Microprocessor-Based Digital Feeder Monitor With High-Impedance Fault Detection," Forty-Seventh Annual Conference For Protective Relay Engineers, College Station, Texas, Mar. 1994.

http://pm.geindustrial.com/FAQ/Documents/F60/GER-3796.pdf.

P.R. Silva, A. Boaventura, W.C. Miranda, J.A. Scott, "Impulse Response Analysis of a Real Feeder for High Impedance Fault Detection," Transmission and Distribution Conference, 1994, Proceedings of the 1994 IEEE Power Engineering Society, Apr. 10-15, 1994.

M. Al-Dabbagh, R.J. Coulter, "Accurate Detection of High Iimpedance Faults on Power Distribution Lines," presented at the Annual Conference of Electricity Supply Engineers' Association of NSW, Manly, Aug. 15-17, 1994.

D.C. Yu, S.H. Khan, "An Adaptive High and Low Impedance Fault Detection Method," IEEE Transactions on Power Delivery, vol. PWRD-9, No. 4, Oct. 1994, pp. 1812-1821 (IEEE PES 1994 Winter Meeting, New York, NY, Jan. 30-Feb. 3).

J. Reason, "Relay Detects Downed Wires by Fault-Current Harmonics," Electrical World, vol. 208, No. 12, Dec. 1994, pp. 58-59.

B.D. Russell, C.L. Benner, "Arcing Fault Detection for Distribution Feeders: Security Assessment in Long Term Field Trials," IEEE Transactions on Power Delivery, vol. PWRD-10, No. 2, Apr. 1995, pp. 676-683 (IEEE PES 1994 Summer Meeting, San Francisco, CA, Jul. 24-28).

R. Patterson, "Signatures and Software Find High-Impedance Faults," IEEE Computer Application in Power, Jul. 1995.

R.F. Hoad, "TU Electric Field Experiences with GE Electric's Digital Feeder Monitor (DFM)." Report distributed at IEEE PSRC Meeting, Jan. 1996.

B.M. Aucoin, R.H. Jones, "High Impedance Fault Implementation Issues." IEEE Transactions on Power Delivery, vol. PWRD-11, No. 1, Jan. 1996. pp. 139-148 (IEEE PES 1995 Winter Meeting, New York, NY, Jan. 29-Feb. 2).

V.L. Bushholz, M. Nagpal, J.B. Neilson, R. Parsi-Feraidoonian, W. Zarecki, "High Impedance Fault Detection Device Tester," IEEE Transactions on Power Delivery, vol. PWRD-11, No. 1, Jan. 1996, pp. 184-190 (IEEE PES 1995 Summer Meeting. Portland, OR, Jul. 23-27).

A.V. Mamishev, B.D. Russell, C.L. Benner, "Analysis of High Impedance Faults Using Fractal Techniques," IEEE Transactions on Power Systems, vol. PWRD-11, No. 1, Feb. 1996, pp. 435-440 (1995 Power Industry Computer Application Conference, Salt Lake City, UT, May 7-12).

A.M. Sharaf, R.M. El-Sharkawy, R. Al-Fatih, M.Al-Ketbi, "High Impedance Fault Detection on Radial Distribution and Utilization Systems," 1996 Canadian Conference on Electrical and Computer Engineering, vol. 2, May 26-29, 1996, pp. 1012-1015.

K.C.P. Wong, H.M. Ryan, J. Tindle, "Power System Fault Prediction Using Artificial Neural Networks," 1996.

C.L. Benner, B.D. Russell, "Practical High-Impedance Fault Detection on Distribution Feeders," IEEE Transactions on Industry Application, vol. 3, No. 3, May/Jun. 1997, pp. 635-640.

A. Mechraoui, D.W.P. Thomas, "A New Principle for High Impedance Resistance Earth Fault Detection Duirng Fast Power Swing For Distance Protection," IEEE Transactions on Power Delivery, vol. PWRD-12, No. 4, Oct. 1997, pp. 1452-1457.

L. A. Snider, Y.S. Yuen, "The Artificial Neural-Networks-Based Relay Algorithm for Detection of Stochastic High Impedance Faults," Neurocomputing, Jul. 23, 1998, pp. 243-254.

C.T. Wai, X. Yibin, "A Novel Technique for High-Impedance Fault Identification," IEEE Transactions on Power Delivery, vol. PWRD-13, No. 3, Jul. 1998, pp. 738-744.

F.G. Jota, P.R.S. Jota, "High-Impedance Fault Identification Using a Fuzzy Reasoning System," IEE Proceedings-Generation, Transmission and Distribution, vol. 145, Issue 6, Nov. 1998, pp. 656-661.

C.R. Sufana, J. Williams, "Challenges in Applying Wide Spread Applications of the Downed Conductor Technology to Distribution Systems," Fifty-Second Annual Conference for Protective Relay Engineers, College Station, Mar. 1999.

K.Y. Lien, S.L. Chen, C.J. Liao, T.Y. Guo, T.M. Lin, J.S. Shen, "Energy Variance Criterion and Threshold Tuning Scheme for High Impedance Fault Detection, " IEEE Transactions on Power Delivery, vol. PWRD-14, No. 3, Jul. 1999, pp. 810-817.

Z.M. Radojevic, V.V. Terzija, M.B. Djuric, "Multipurpose Overhead Lines Protection Algorithm," IEE Proceedings: Generation, Transmission and Distribution, vol. 146, Issue 5, 1999, pp. 441-445.

S.J. Huang, C.T. Hsieh, "High-Impedance Fault Detection Utilizing A Morlet Wavelet Transform Approach," IEEE Transactions on Power Delivery, vol. PWRD-14, No. 4, Oct. 1999, pp. 1401-1410.

A. Lazkano, J. Ruiz, E. Aramendi, L.A. Leturiondo, "A New Approach to High Impedance Fault Detection Using Wavelet Packet Analysis," Harmonics and Quality of Power, 2000. Proceedings. Ninth International Conference, vol. 3, Oct. 1-4, 2000, pp. 1005-1010.

A. Lazkano, J. Ruiz, E. Aramendi, L.A. Leturiondo, J.A. Gonzalez, "Study of High Impedance Fault Detection in Levante Area in Spain," Harmonics and Quality of Power. 2000. Proceedings. Ninth International Conference, vol. 3, Oct. 1-4 2000. pp. 1011-1016.

L. Li, M.A. Redern, "A Review of Techniques to Detect Downed Conductors in Overhead Distribution Systems," 7th International Conference on (IEE) Developments in Power Systems Protections, Apr. 9-12, 2001, pp. 169-172.

T.M. Lai, L.A. Snider, E. Lo, "Wavelet Transformation Based Algorithm for the Detection of Stochastic High Impedance Faults," International Conference on Power Systems Transients, IPST 2003, New Orleans.

A.M. Sharaf, Guosheng Wang, "High Impedance Fault Detection Using Feature-Pattern Based Relaying," Transmission and Distribution Conference and Exposition, 2003 IEEE PES, vol. 1, Sep. 7-12, 2003, pp. 222-226.

R. Das, S.A. Kunsman, "A Novel Approach for Ground Fault Detection," 57th Annual Conference for Protective Relay Engineers, College Station, Texas, Mar. 30-Apr. 1, 2004.

Sheng Yang, S.M. Rovnyak, "Decision Tree-Based Methodology For High Impedance Fault Detection," IEEE Transactions on Power Delivery, vol. PWRD-19, No. 2, Apr. 2004, pp. 533-536.

M. Carpenter, R. Hoad, T.D. Bruton, R. Das, S.A. Kunsman, J. Peterson, "Staged-Fault Testing For High Impedance Fault Data Collection," 31st Annual WPRC, Oct. 19-24, 2004, Spokane, WA.

A.C. Depew, J.M. Parsick, R.W. Dempsy, C.L. Benner, B.D. Russell; M.G. Adamiak, "Field Experience with High-Impedance Fault Detection Relays," 2005-2006.

GE F60 Feeder Mangement Relay pages Chapter 8 and pp. 5-153 through 5-158 (http://www.geindustrial.com/products/manuals/f60/f60man-f2.pdf).

ABB REF 550 Advanced Feeder Protection System pp. 1-4 through 1-10, and 1-23, (http://library.abb.com/GLOBAL/SCOT/scot229.NSF/VerityDisplay/CCEB1EA700037BB885256FD5005D257D/$File/7.11.1.7-50 REF550.pdf).

N.I. Creasey, "Very Sensitive Earth-Fault Protection of Three-Phase 11 kV Overhead Lines," ERA Report (S. Africa), Rep. 5093, Pt. II, 1964, pp. 62-87.

GE Product Bulletin GEK-105559, DFP200 Distribution Relay.

S.R. Nam, J.K. Park, Y.C. Kang, T.H. Kim, "A Modeling Method of a High Impedance Fault in a Distribution System Using Two Series Time-Varying Resistances in EMTP," IEEE Power Engineering Society Summer Meeting, Jul. 15-19, 2001, vol. 2, pp. 1175-1180.

* cited by examiner

1601

1602

SYSTEMS AND METHODS FOR DETECTING HIGH-IMPEDANCE FAULTS IN A MULTI-GROUNDED POWER DISTRIBUTION SYSTEM

FIELD OF THE INVENTION

The present invention relates generally to detecting high-impedance faults in multi-grounded electric power distribution systems.

BACKGROUND OF THE INVENTION

High-impedance faults (HIFs) are difficult to detect on multi-grounded electrical power distribution systems. One reason for this difficulty is that many of the loads on the system are single-phase in nature. The system can therefore be quite unbalanced when a major single-phase lateral is out of service. The conventional ground fault protection has to be set above the maximum foreseeable unbalance to avoid false tripping. Conventional ground fault protection is thus not effective for HIF protection.

The second reason that HIFs are difficult to detect is that the HIF current level is typically small. For example, the HIF current level may range anywhere from about zero amperes to less than 100 amperes depending upon the ground surfaces that a power conductor contacts.

Many untraditional algorithms have been developed to detect HIF at the substation level in the power distribution system. Most of these algorithms use off-fundamental frequency components of phase or residual currents, and use complicated methods such as expert systems, neural networks, wavelets and higher-order statistics.

An algorithm that detects certain HIFs is relatively easy to design. However, it is a greater challenge to also design a secure algorithm. Electrical utilities desire to have secure HIF protection. The objective of HIF protection is not to protect the power system and apparatus from damage resulting from an HIF. Rather, the objective of implementing secure HIF protection is to remove an unsafe public condition, which may also avoid or minimize any attendant legal issues relating to the condition. When a detection device indicates the occurrence of an HIF, a utility has to make a decision based upon the circumstances. For example, it may be more dangerous to trip the electrical power to a traffic light at a busy traffic intersection or to a hospital. For such reasons, utilities cannot tolerate false alarms from HIF detection devices.

Moreover, when an HIF is detected, a number of factors or circumstances may need to be considered before a tripping decision is made. For example, it may be more dangerous to trip the power to traffic lights at a busy intersection, or to a hospital. For reasons such as these, a utility cannot normally tolerate any false HIF detection.

A general object of the present invention is to therefore provide improved systems and methods for detecting an HIF in a multi-grounded distribution system.

Another object of the present invention is to provide improved systems and methods for detecting an HIF that is secure from false detections.

A further object of the present invention is to provide improved systems and methods for detecting an HIF that may be easily incorporated into existing distribution relays and related equipment.

SUMMARY OF THE INVENTION

The present invention is directed to methods for detecting a high-impedance fault in a multi-grounded electrical distribution system. The method includes the steps of calculating a plurality of sum of differences for at least one distribution system quantity with a sum of difference filter, providing a set of predetermined blocking conditions, providing a trending and memory with an output, receiving the plurality of sum of differences from the sum of difference filter, receiving the set of predetermined blocking conditions, receiving the output of the trending and memory, and generating a set threshold with an adaptive tuning algorithm, establishing a reference based upon the plurality of power distribution quantities differences from the one-cycle difference filter and the set threshold from the adaptive tuning algorithm, calculating a ratio of the difference between the plurality of sum of differences from the sum of difference filter and the reference, memorizing a time and forming a trend output if the ratio of the difference exceeds the set threshold, and determining the existence of a high-impedance fault with decision logic based on the trend output and the set of predetermined blocking conditions.

Additional methods in accordance with the present invention may include the steps of calculating the sum of difference based on every two cycles, calculating the sum of difference based on any sample point within a cycle, and/or deriving the plurality of power system quantities samples from off harmonics, and any frequency contents in the system. Each cycle may be sampled at the rate of thirty-two samples per second. Off harmonics may include all non-integer multiples of a fundamental frequency in the system. The harmonics may include even and odd harmonics in the system. The power system quantities may include energy, current or other parameters. Preferably, the adaptive tuning algorithm tunes out feeder ambient characteristics in the system. The distribution system may be a three-phase distribution system, with the detection methods applicable to each of the three phases in the three-phase distribution system. The sum of difference filter may be a one-cycle difference filter.

The method step of establishing a reference based upon the plurality of power distribution quantities differences from the one-cycle difference filter and the set threshold from the adaptive tuning algorithm may be performed by an infinite-impulse-response averager, the infinite-impulse-response averager limiting its input and/or changes its time constant according to its input and other conditions.

The present invention is also directed to apparatus for detecting a high-impedance fault in a multi-grounded electrical distribution system. The apparatus may include a sum of difference filter for calculating a plurality of sum of differences for at least one distribution system quantity, a set of predetermined blocking conditions, a trending and memory with an output, an adaptive tuning algorithm for receiving the plurality of power distribution quantities differences from the sum of difference filter, for receiving the set of predetermined blocking conditions, for receiving the output of the trending and memory and for generating a set threshold, an infinite-impulse-response averager for establishing a reference based upon the plurality of power distribution quantities differences from the one-cycle difference filter and the set threshold from the adaptive tuning algorithm, the trending and memory for calculating a ratio of the difference between the plurality of sum of differences from the sum of difference filter and the reference from the infinite-impulse-response averager, for memorizing a time and for forming a trend output if the ratio of the difference exceeds the set threshold from the adaptive tuning algorithm, and a decision logic for determining the existence of a high-impedance fault based on the trend output from the trending and memory and the set of predetermined blocking conditions.

The apparatus in accordance with the present invention may calculate the sum of differences based on every two cycles, calculate the sum of differences based on any sample point within a cycle and/or may sample any power system quantity at the rate of thirty-two samples per second. The plurality of power system quantities may include samples of any off harmonics, and any frequency contents in the system. The off harmonics may include all non-integer multiples of a fundamental frequency in the system. The harmonics may include even and odd harmonics in the system. The power system quantities may be energy, current, or any other power system parameter. Preferably, the adaptive tuning algorithm tunes out any feeder ambient characteristics in the system. The distribution system may be a three-phase distribution system, with the apparatus applicable to each of the three phases in the three-phase distribution system. The infinite-impulse-response averager may limit its output and/or change its time constant according to its input and other conditions. The sum of difference filter may be a one-cycle difference filter.

BRIEF DESCRIPTION OF THE DRAWINGS

The invention, together with its objects and the advantages thereof, may best be understood by reference to the following description taken in conjunction with the accompanying drawings, in which like reference numerals identify like elements in the figures, and in which.

DESCRIPTION OF THE PREFERRED EMBODIMENTS

Figure 1A:
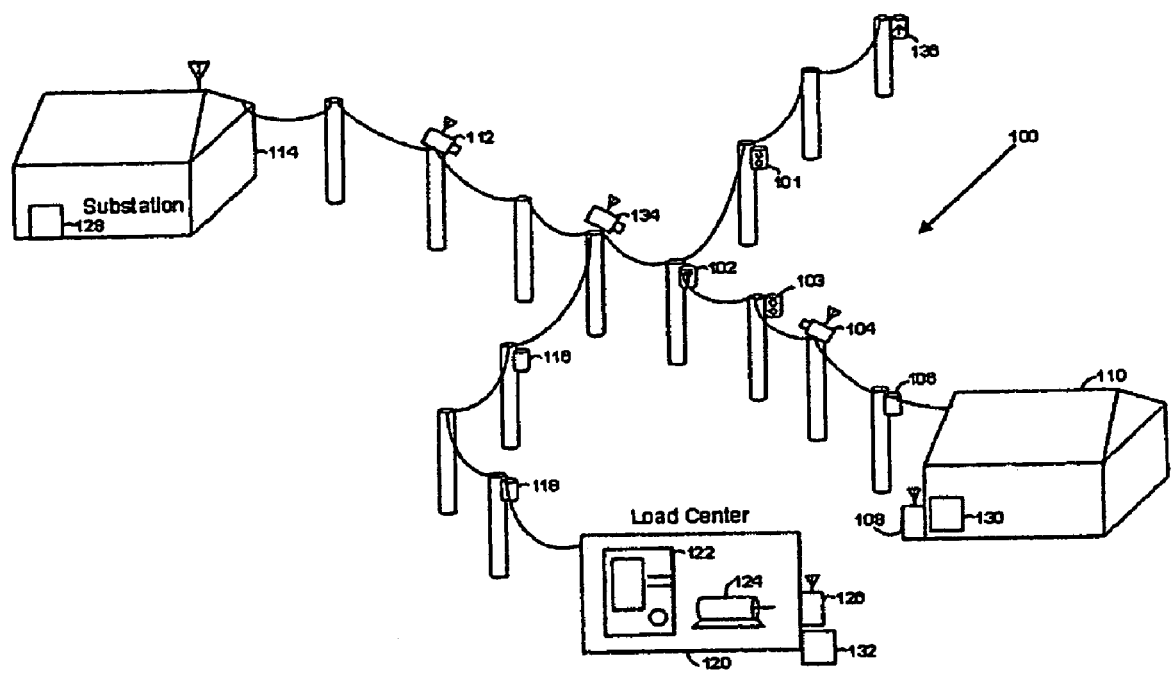
FIG. 1A is a diagram of a typical electrical distribution system illustrating placement of high-impedance fault (HIF) detection devices in various locations between a substation and end users in accordance with the present invention.

It will be understood that the present invention may be embodied in other specific forms without departing from the spirit thereof. The present examples and embodiments, therefore, are to be considered in all respects as illustrative and not restrictive, and the invention is not to be limited to the details presented herein. FIG. 1A illustrates an exemplary electrical power distribution system, generally designated 100. Electrical power distribution system 100 provides electrical power, such as from a substation 114 to an end user location 110 and to a load center 120.

FIG. 1A also depicts possible locations of detection devices for detection of high-impedance faults in an electric power distribution system from a substation 114 to end-users, such as at 110. For example, many of the devices in FIG. 1A constitute a high-impedance fault detection system and coordinate with each other using the fault current magnitudes, the number of arcing counts and/or communication signals. Such devices may include, for example, a fault indicator with HIF detection 101; a pole-top recloser with HIF detection and coordination 102; a fault Indicator with HIF detection 103; a video camera 104 with communication means; an electronic fuse with HIF detection 106; a loss of voltage detection 108 with communication means; an end user location 110 which may automatically call upon loss of service; a video camera 112 with communication means; a substation 114 with wireless, power-line carrier, fiber and other communications; a sectionalizer 116 with HIF detection; an electronic fuse 118 with HIF detection; a loss of voltage detection device 126 with communication means; a signal injection device 128; a signal receiving and alarming device 130 and 132; an altimeter or laser range finder 134 with a down-conductor detection device; and/or a fault indicator 136 with loss of voltage alarm The loss of voltage at an end user location 110 is one of the most reliable detection methods of high-impedance fault caused by downed conductors. Once a loss of voltage condition is detected, either by an end user location 110 or by a detection device 108 or 126, such as a loss of voltage detection, the condition is communicated back to an operator of the system, either by a customer call or a communication signal through a fiber, radio, wireless, power line carrier or other communication channels. The operator then sends out someone to locate the fault.

All the detection algorithms designed for a substation detection device can be fitted or simplified to fit in a device such as pole-top recloser controls 102 with HIF detection and coordination, sectionalizers 116, electronic smart fuses 106 and 118 and fault indicators 101 and 103. As the current magnitude of a high-impedance fault is small and its rich high frequency and harmonic contents attenuate from the fault location back to a substation, it is easier to detect the high-impedance fault as we move a detection device from substation close to the fault.

FIG. 1A also includes other type of devices to compliment the entire high-impedance fault detection system. A video camera 104 that has image pattern recognition program or a visual monitoring system, such as one disclosed in U.S. Pat. No. 5,805,813, can be used to detect a downed conductor and communicate the information to system operators through wireless or other communication systems. An altimeter 134 or a laser range finder can also be used to detect a dramatic position change of conductors and alarm system operators. Finally, a signal injecting and receiving system 128, 130 and 132 can be also installed in a distribution system to detect a broken conductor and provide alarms. It is much like the loss of voltage system described earlier.

Figure 1B:
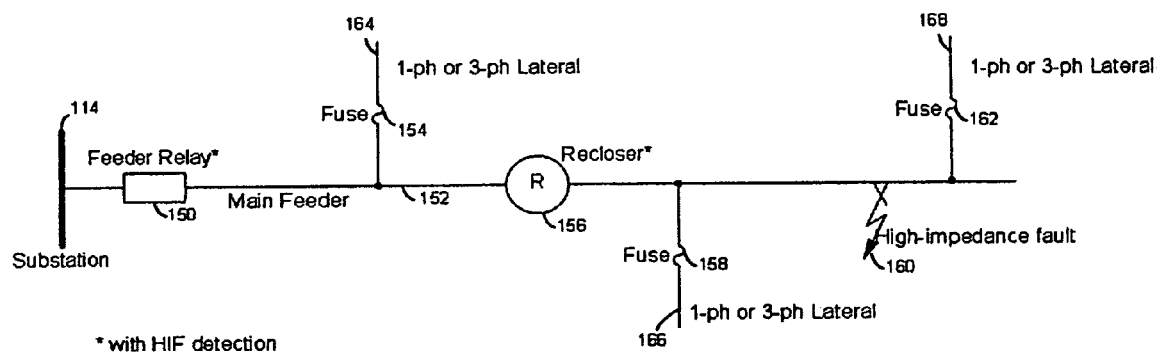
FIG. 1B is a line diagram of a portion of the electrical distribution system of FIG. 1 in which a distribution feeder includes HIF detection in a substation relay and in a recloser in accordance with the present invention.

FIG. 1B is a subset of FIG. 1A in terms of high-impedance fault protections and distribution feeder configurations. FIG. 1B shows the concept of coordination between the substation feeder relay 150 and the recloser control 156 for a high-impedance fault 160 that occurs downstream to the recloser control 156. A main feeder 152 provides electrical power from a substation 114 to a plurality of single-phase or three-phase lateral lines 164, 166 and 168. Each of lateral lines 164, 166 and 168 is protected by a fuse 154, 158 and 162, respectively.

The HIF detection techniques of the present invention can be implemented into existing intelligent electronic devices (IEDs), such as relays. The IED may include, for example, feeder relay 150 and recloser 156 shown in FIG. 1B. Preferably, the HIF techniques of the present invention are within the processing capabilities of existing IEDs such that existing IEDs may be retrofitted with the present invention.

Preferably, these HIF detection techniques include the following four elements or characteristics. (1) An informative quantity that reveals HIF signatures as much as possible and that is not affected by loads or other system operation conditions. (2) A running average of the quantity that provides a stable pre-fault reference. This average is preferably available all the times, including during an HIF condition, and does not require quick tracking of the fault quantity. (3) Adaptive tuning that learns and tunes out feeder ambient noise conditions. Preferably, the tuning is active whenever there is no HIF detected on the system. (4) An effective artificial intelligent classification or pattern recognition method to differentiate an HIF condition from other system conditions, such as switching operations and noisy loads.

Figure 2:
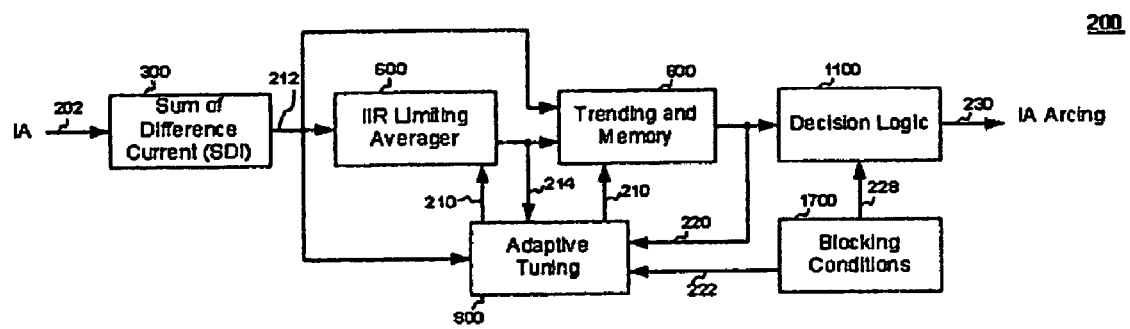
FIG. 2 illustrates a block diagram of an HIF detection process for one of the phases of the electrical power distribution system, such as the A-phase, in accordance with the present invention.

FIG. 2 shows a block diagram 200 of the HIF methods for the A-phase current. Similar processing should also be implemented for the B- and C-phase currents in a three-phase distribution system. An input quantity such as A-phase current 202 is input to a sum of difference current (SDI) 300, which calculates a quantity on which the HIF detection is based. This quantity is called SDI 212 for sum of difference current. An IIR (infinite-impulse-response) limiting averager 600 provides a stable SDI reference 214. The trending and memory 800 compares SDI with this SDI reference 214 from IIR Limiting Averager. The trending and memory block then memorizes the time and a ratio if SDI is a set-threshold above the average. These results from the trending and memory 800 are then used by the decision logic 1100 to derive a final decision of HIF occurrence on the monitored phase of the distribution system. The adaptive tuning 900 monitors the feeder background noise during normal system operations and establishes a comparison threshold 210 for the trending and memory 800. This comparison threshold 210 is also used by IIR limiting averager 600 to limit the input magnitude to the IIR limiting averager when it is too large. The Blocking Conditions block 1700 detects system conditions other than high-impedance faults and then blocks the functions such as adaptive tuning 900 and the decision logic 1100.

As identified earlier, the quantity to be used in HIF detection is important to the detection success. Since the HIF fault current magnitude, either the root mean square (RMS) value or the magnitude of the fundamental system frequency component, is much below the maximum possible load unbalance at the substation, other quantities need to be searched or evaluated for HIF detection. Each distribution feeder, such as feeder 152 in FIG. 1B, has a certain amount of harmonic energy during normal operations. This energy is normally dominated by the odd-harmonic energy. The even or off-harmonic energy generally contains more fault information because such harmonics are small during normal system operations. Off-harmonics may include non-integer multiples of a fundamental frequency. Calculating even-harmonic energy requires expensive Fast Fourier Transform (FFT) operations. However, the total off-harmonic content can be simply obtained through a summation of absolute values of a differenced current with a differencing window that is one cycle of the system frequency.

Figure 3:
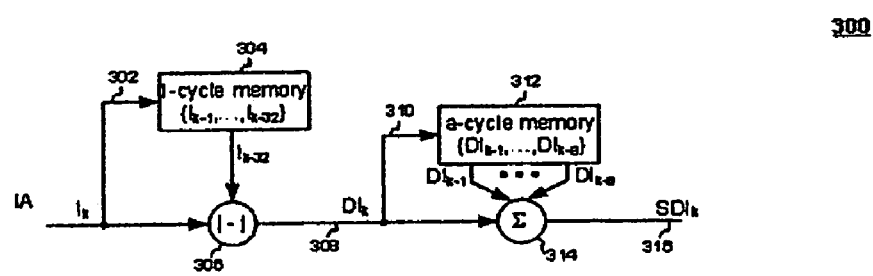
FIG. 3 is a diagram which illustrates further details of an exemplary implementation of the Sum of Difference Current (SDI) block shown in FIG. 2 in accordance with the present invention.

In FIG. 3, the details of the SDI block 300 in FIG. 2 are shown in greater detail. Ideally, the power system frequency is tracked and the three-phase currents from a power distribution feeder, such as feeder 152, are sampled at an integer number of samples per cycle. Hereafter, a variable name without a subscript is a collective term for a variable, such as SDI, for example. When a signal value is referred to at a specific time instance, the variable name is used with a subscript. For example, $SDI_k$ is a specific SDI value at the time instance k. The example shown in FIG. 5 uses a sampling rate of 32 samples per cycle. In FIG. 3, the subscript k refers to the present sampling time, and k−1 refers to the previous sampling time. K−32 refers to the time of 32 samples ago, which separates in time exactly one cycle from present sampling time k for a 32-sample-per-cycle sampling rate. Mathematically, the calculations of the difference current (DI) and the sum of difference current (SDI) can be expressed in the following equations, $$DI_k = |I_k - I_{k-32}|$$

$$SDI_k = \sum_{n=0}^{a} DI_{k-n},$$

where a represents the number of samples desired for summation.

The SDI calculation use two memory blocks. The first memory 304 in FIG. 3 is one-cycle long. Memory 304 saves one-cycle worth of current samples 302 and provides a one-cycle old sample in the difference calculation 306. The other memory 312 may be from two to several cycles long to save several cycles worth of the absolute values of difference currents from the difference calculation 306 and to provide all samples for the summation calculation by summer 314. DI on line 308 is calculated at the sampling rate of the currents. However, SDI on line 316 may be calculated once every two cycles.

Figure 4:
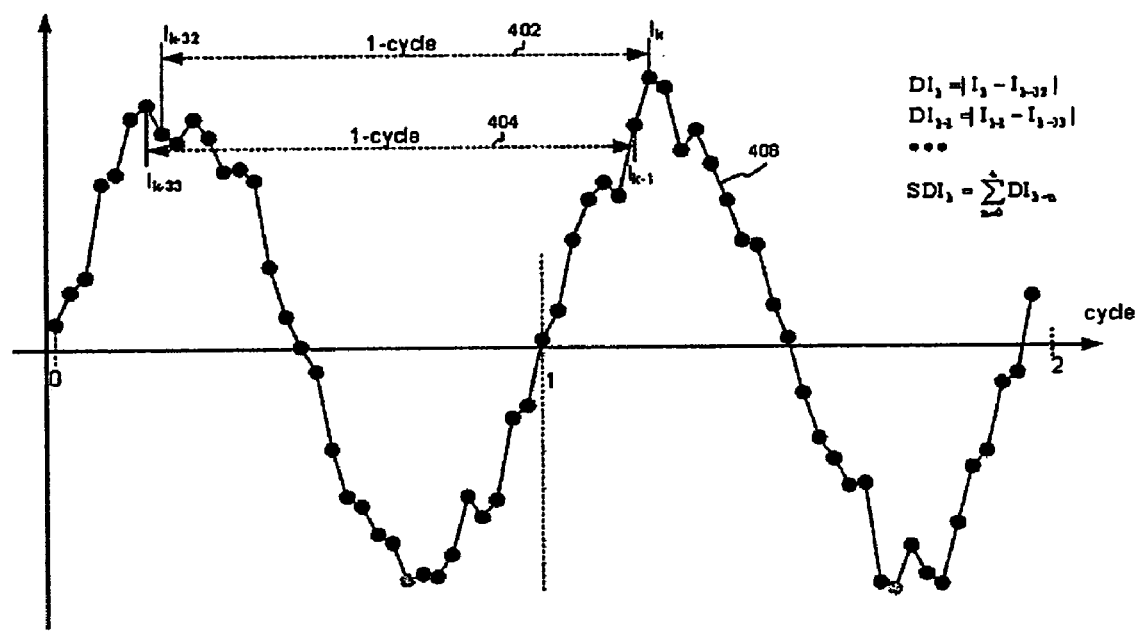
FIG. 4 is a waveform illustrating the calculation of difference current and the Sum of Difference Current on a time-domain current waveform in accordance with the present invention.

FIG. 4 shows the difference current and the SDI calculation on a time-domain current waveform 406. The frequency magnitude response of the one-cycle difference calculations by the SDI calculator in FIG. 3 has a magnitude response which is zero at every harmonic frequency point including the DC and the fundamental frequency. Therefore, all harmonic contents including the DC and the fundamental frequency of the current are blocked after the difference calculation of the SDI current in FIG. 3. However, the frequency components near the half harmonics are amplified by the difference calculation, that is, the gain of the frequency response is greater than one. The frequency contents of the difference current on line 316 of the SDI therefore contain only off harmonics. SDI represents a measure of the average total off-harmonic content of a current over a two-cycle window. This makes SDI a desirable quantity for use in HIF detection.

Figure 5:
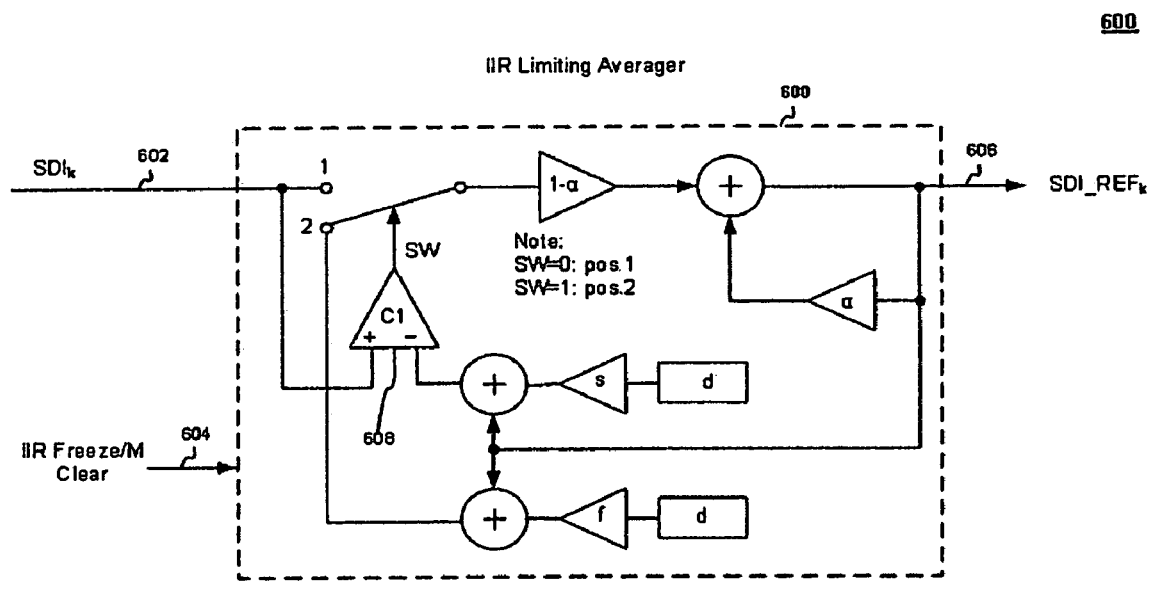
FIG. 5 is a schematic diagram illustrating further details of an exemplary implementation of the infinite-impulse-response (IIR) Limiting Averager block shown in FIG. 2 in accordance with the present invention.

The IIR limiting averager is shown in greater detail in FIG. 5. The IIR limiting averager provides a reliable reference average, $SDI\_REF_k$ on an output line 606. A reliable reference average is important to successful HIF detection. An infinite-impulse-response (IIR) type of averaging with a fixed time constant is used because long-time memory effects can be achieved efficiently with fewer calculations and memory units. A relatively long time constant is preferably chosen to provide a stable reference during faults. For example, a one-second time constant may be used. To prevent that the reference average on output line 606 from quickly following the sporadic spikes of off-harmonic content when the SDI value is above a threshold, the input to the averager 600 is preferably limited. Alternatively, another way of stabilizing the average output in case of high input spikes is to use a variable time constant. For example, U.S. Pat. No. 5,790,418 (hereby incorporated by reference) discloses a polarizing quantity memory filter.

FIG. 5 shows the details of the IIR input limiting averager 600. The averager output, $SDI\_REF_k$, follows the general first order IIR equation, $$SDI\_REF_k = (1-\alpha) \cdot x_{in} + \alpha \cdot SDI\_REF_{k-1},$$

where α relates to the time constant and $x_{in}$ can take two possible values according to the output of comparator 608. The input to the positive polarity of the comparator 608 is $SDI_k$ from line 602, and the input to the negative polarity of the comparator 608 is $sd+SDI\_REF_{k-1}$. Constant s can be any integer larger than one. The variable d will be introduced below with respect to the adaptive tuning and it can be treated as a constant here. The comparator output will be a logic 1 if $SDI_k > sd+SDI\_REF_{k-1}$, and a logic 0 otherwise. When the comparator output is a logic 0, the switch SW is in its position 1 and $x_{in}$ therefore equals to $SDI_k$. When the comparator output is a logic 1, the switch SW is in its position 2 and $x_{in}$ therefore equals to $d+SDI\_REF_{k-1}$. Putting everything together, the output of the averager 600 on line 606, $SDI\_REF_k$, is calculated from the equation, $$SDI\_REF_k = \frac{(1-\alpha) \cdot SDI_k +}{\alpha \cdot SDI\_REF_{k-1}} \quad \text{if } SDI_k < s \cdot d + SDI\_REF_{k-1}.$$
$$= (1-\alpha) \cdot f \cdot d + SDI\_REF_{k-1} \quad \text{otherwise}$$

The following equation relates the time constant TC in seconds, to the a value, at a given processing rate PR in Hz, $$\alpha = e^{-\frac{1}{PR \cdot TC}}.$$

For example, if TC is chosen to be one second, then α equals to 0.9672 when the processing rate is 30 Hz, or every two cycles for the 60 Hz power systems.

When conditions other than HIF occur, the freeze input on line 604 to the IIR limiting averager 600 is a logic 1 and the IIR limiting average calculation is suspended. For example, these non-HIF conditions may include large difference currents and some difference voltages.

Figure 6:
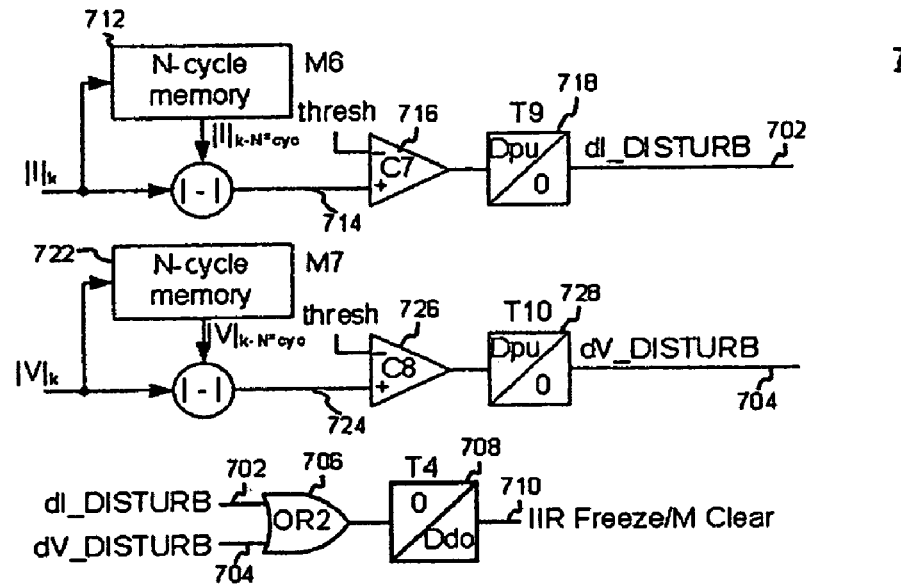
FIG. 6 is a schematic diagram illustrating further details of an exemplary implementation of freeze conditions for the IIR Limiting Averager implementation shown in FIG. 5 in accordance with the present invention.

The IIR freeze/M clear input on line 604 of the IIR limiting averager 600 in FIG. 5 may be generated as shown in FIG. 6. An N-cycle memory 712 stores current samples $I_k$ from the monitored phase of the electrical distribution system. Absolute values of these current samples $I_k$ on line 714 are compared to a threshold at comparator 716. Those current samples which exceed the threshold are time delayed in a timer 718, which provides the dI_DISTURB output on line 702. Similarly, an N-cycle memory 722 stores N voltage samples $V_k$ from the monitored phase of the electrical distribution system. Absolute values of voltage samples $V_k$ on line 724 are compared to a threshold at comparator 726. Those voltage samples which exceed the threshold are time delayed in a timer 728, which provides the dV_DISTURB output on line 704. The outputs dI_DISTURB and dV_DISTURB are then input to an OR gate 706. The outputs of OR gate 706 are stored in a table 708. Those values of current or voltage which exceeded the thresholds may then initiate a freeze of the IIR limiting averager 600 on input line 604 in FIG. 5. Otherwise, this input to the averager will clear the memory in the averager.

Figure 7:
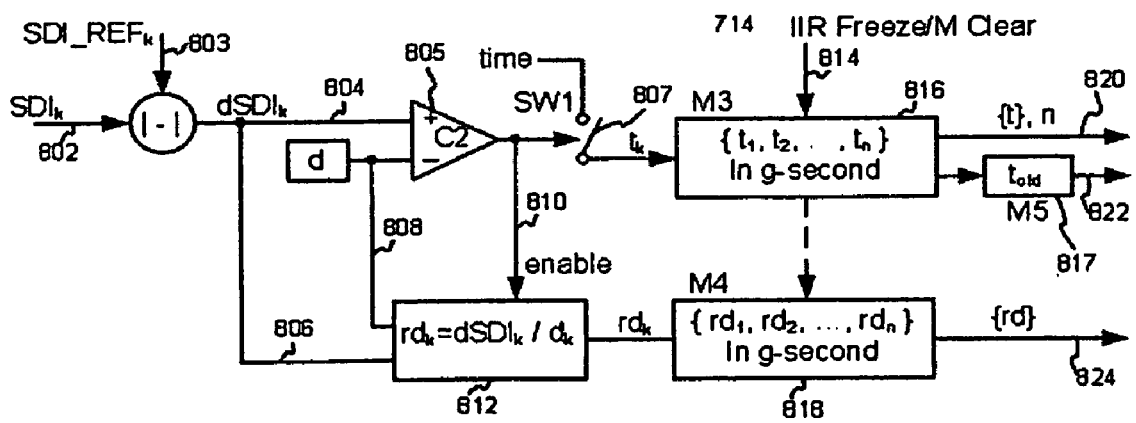
FIG. 7 is a schematic diagram illustrating further details of an exemplary implementation of the Trending and Memory block shown in FIG. 2 in accordance with the present invention.

The trending and memory 800 of FIG. 2 is shown in greater detail in FIG. 7. Once the detection quantity SDI and its average SDI_REF are established by the sum of difference current 300 and by the IIR limiting averager 600, respectively, the HIF signatures or information can be extracted from these quantities. The purpose of the trending and memory 800 is to record unusual changes of SDI that is related to HIF on the system and to memorize these changes for the decision logic 1100. The trending and memory logic 800 thus provides information regarding how much and how often SDI exceeds SDI_REF plus a margin d.

The portion of the logic below the comparator 805 in FIG. 7 runs at the rate of every SDI update, or 30 Hz when SDI is calculated every two cycles as in the prior example. The rest portion of the logic runs whenever comparator 805 outputs a logic 1. The absolute value of the difference between SDI 802 and SDI_REF 803, or dSDI 804, goes to the positive input of the comparator 805. The negative input of the comparator is connected to a variable d. The variable d will be introduced in the Adaptive Tuning subsection, paragraphs 0058-0062 below, and can be treated as a constant here.

When dSDI is greater than d, the output of comparator 805 will be a logic 1. Otherwise the comparator output is a logic 0. A logic 1 from comparator 805 closes the switch 807, which takes a record of the time at which the switch 807 closes. The recorded time is saved in a memory block 816 which has enough units to save the maximum possible number of $t_k$ within one second. When the comparator is operating at a rate of 30 Hz, the maximum number of $t_k$ is also 30 and the memory should have 30 units. At the beginning of each second, in the previous set $\{t_1, t_2, \ldots, tn\}$ is not zero, then the last time value, $t_n$, is moved to a single memory unit 817 as $t_{old}$. If set $\{t_1, t_2, \ldots, t_n\}$ does not have any members, then memory 817 retains its previous value as $t_{old}$.

A logic 1 output from the comparator 805 also enables on line 810 a ratio calculation at block 812 of dSDI to d. The calculated ratio values, $rd_k$, are saved in another memory 818 that has the same number of units as memory 816. The outputs on lines 820, 822 and 824 of the trending and memory logic 800 are sets of t, the old time value $t_{old}$, and rd, respectively, within previous one second time. The number of t and rd records within the previous one second is n, which is another output on line 820. When conditions other than HIF occur, the freeze input is a logic 1, the memories 817 and 818 are cleared and their updates are also suspended. These non-HIF conditions may include large difference current changes and smaller difference voltage changes.

During power distribution feeder normal operations, different loads come on and off, motors start and stop, capacitors and load-tap changers switch on and off. These activities all affect the sum of different current SDI and its total off-harmonic contents. Changes in these feeder operations and load characteristics may be hourly, daily, monthly or seasonal. To make the HIF detection function dependable and secure, all such feeder operations and load characteristics are better acquainted by the detection logic. The purpose of the adaptive tuning 900 in FIG. 2 is to learn or develop a margin above SDI average that SDI value may fall into during normal system operations. This margin is denoted as variable d, which is used in both IIR limiting averager 600 and in trending and memory 800.

Figure 8:
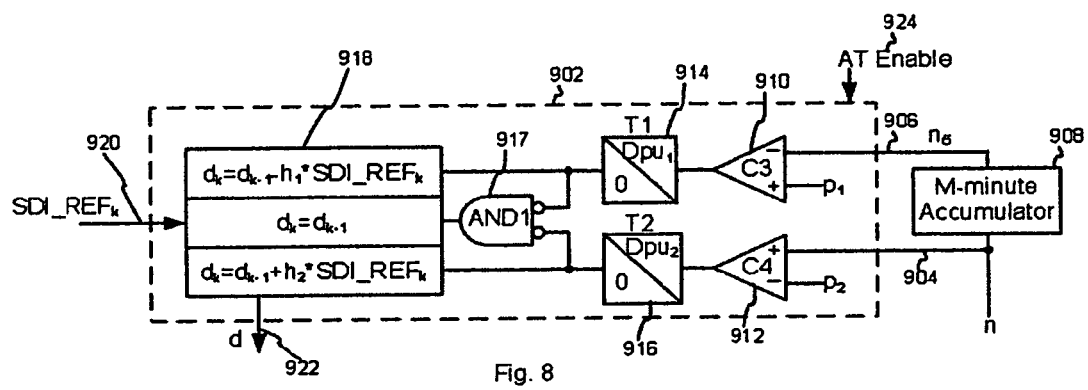
FIG. 8 is a schematic diagram illustrating further details of an exemplary implementation for the Adaptive Tuning Logic block shown in FIG. 2 in accordance with the present invention.

FIG. 8 provides further details of the adaptive tuning logic 900 of FIG. 2. In this logic, the comparator 910, timer 914 and the corresponding upper-row d update calculation run periodically, such as once every five minutes. The rest of the logic, such as comparator 912 and timer 916, runs more frequently or continuously, such as every one-second. There are two inputs on the right of FIG. 8, n on line 904 and n5 on line 906. n is the number of times that SDI was above its average plus the margin d within previous one second of time, as explained above with respect to the trending and memory logic 800. The value n is added up for five minutes in an accumulator 908 and its output is n5 on line 906, which in this example is the number of times that SDI was above its average plus the margin d within previous five minutes of time.

A first comparator 912 of the adaptive tuning logic 900, compares the value of n to a threshold $p_2$. If n is greater than $p_2$, the output of comparator 912 is a logic 1, otherwise, the output of comparator 912 is a logic 0. If the output of comparator 912 is a logic 1 for a consecutive period of $Dpu_2$ seconds, as is determined by the timer 916, the timer 916 outputs a logic 1, which enables the bottom row of block 918 to initiate an update calculation of the margin d. At the same time, the logic 1 output of timer 916 goes to an input of AND gate 917 to force its output to a logic 0. In other words, if SDI is above its average plus a margin d for more than $p_2$ in a second, and if the condition lasts for $Dpu_2$, then the margin d is determined to be too small, and the corresponding update calculation will increase the margin d by a predetermined amount, such as in accordance with the equation $$d_k = d_k + h_2 \cdot SDI\_REF_k.$$

For example, $h_2$ may be a value in the range of 0 to 25 percent and the margin d may typically be increased by about five percent of the average.

A second comparator 910 of the adaptive tuning logic 900 compares the value of n5 to a threshold $p_1$. If n5 is less than $p_1$, the output of comparator 910 is a logic 1, otherwise, the output of comparator 910 is a logic 0. If the output of comparator 910 is logic 1 for a consecutive period of $Dpu_1$ minutes as is determined by the timer 914, the timer 914 outputs a logic 1, which enables the upper row d update calculation in the upper row of block 918. At the same time, the logic 1 output of timer 914 goes to an input of AND gate 917 to force its output to a logic 0. In other words, if SDI is not above its average plus a margin d for $Dpu_1$ time, then the margin d is determined to be too large, and the corresponding update calculation will decrease it by a predetermined amount, such as in accordance with the equation $$d_k = d_k - h_1 \cdot SDI\_REF_k.$$

For example, $h_1$ may be a value in the range of 0 to 25 percent and the margin d may be decreased by about two percent of the average.

If both outputs of timers 914 and 916 are logic 0, the AND gate 917 outputs a logic 1, which enables the middle row of block 918 to update the calculation for the margin d. In this instance, the new value for margin d may be kept the same as the prior value.

The AT Enable input 924 of FIG. 8 determines when the update for d takes place. Ideally, the tuning process should be continuous as long as there is no HIF or other faults on the system. The tuning should be also enforced within certain period of time after a breaker closure is detected and currents are detected.

Figure 9:
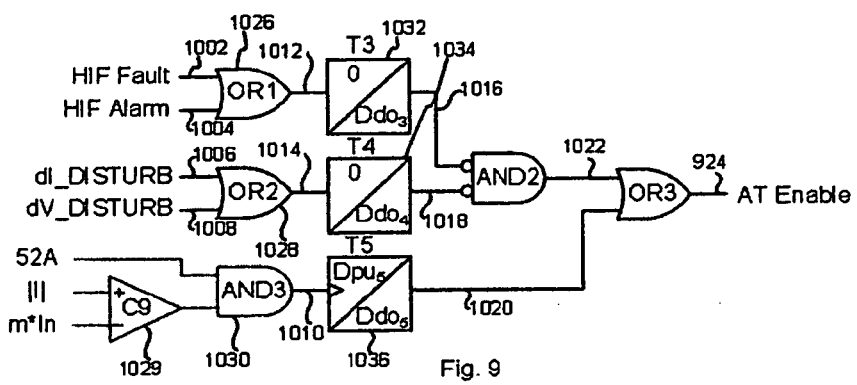
FIG. 9 is a schematic diagram illustrating further details of an exemplary implementation of enable conditions for the Adaptive Tuning Logic block shown in FIGS. 2 and 8 in accordance with the present invention.

FIG. 9 shows the enable conditions for the adaptive tuning logic 900 in FIG. 8. Part of the enable logic, OR1 gate 1026 and timer 1032, is also used to freeze IIR limiting averager 600, as shown in FIG. 5.

Figure 10:
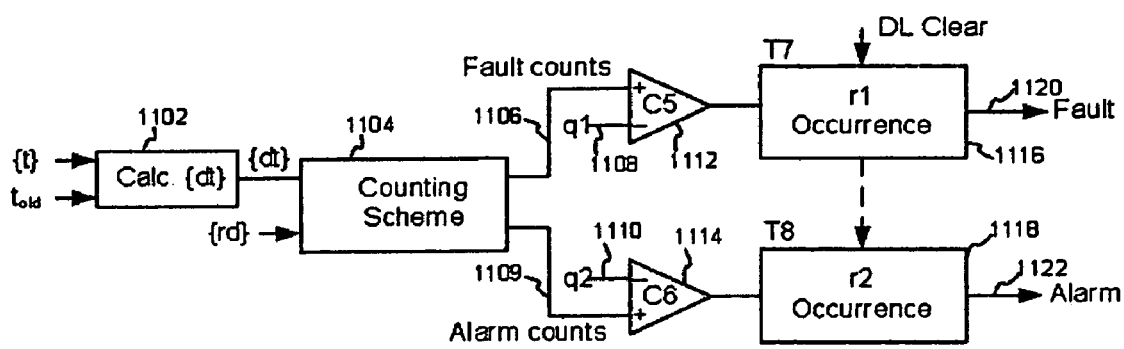
FIG. 10 is a schematic diagram illustrating further details of an exemplary implementation for the Decision Logic Counters block shown in FIG. 2 in accordance with the present invention.

FIG. 10 shows further details of the decision logic 1100, also previously shown in FIG. 2. The trending and memory function block 800 in FIGS. 2 and 7 provides rich information regarding to "how much" and "how often" that SDI overcomes its reference plus a learnt margin d. The information of "how much" is represented by a set of ratios, {rd}. The information of "how often" is represented by the value of n, the number of times that SDI went above the threshold within previous one second. The first block 1102 of the decision logic 1100 in FIG. 10 calculates a set of time differences, {dt}, using the set of time, {t} and $t_{old}$ from the trending and memory 800. The time difference can provide the time characteristic of randomness signature of the high-impedance faults. This information can be used in more sophisticated artificial intelligence methods of classification and pattern recognition, such as neural networks, expert systems or decision trees. For this invention, however, we choose to use a pair of counters 1116 and 1118, as shown in FIG. 10.

The decision logic 1100 may run at a rate of once per second. In this example, it utilizes two counters; counter 1116 for providing an HIF fault output 1120 and counter 1118 for providing an HIF alarm output 1122. For each pair of (rd,dt) in previous one-second segment, the decision of count or no-count for fault or alarm, and the number of counts are determined in the counting scheme. For example, for each one-second segment, if the number of counts for HIF fault is greater than $q_1$, as is determined by comparator 1112, the comparator 1112 outputs a logic 1. Counter 1116 accumulates the number of logic 1s from comparator 1112. If three occurrences are accumulated within five one-second segments, counter 1112 outputs a logic 1 to indicate a high-impedance fault detection. The HIF alarm decision is derived in a similar way through comparator 1114 and counter 1118. Comparator 1114 may use a different detection threshold from that used by comparator 1112 as indicated at comparator inputs 1108 and 1110 in FIG. 10.

Figure 11:
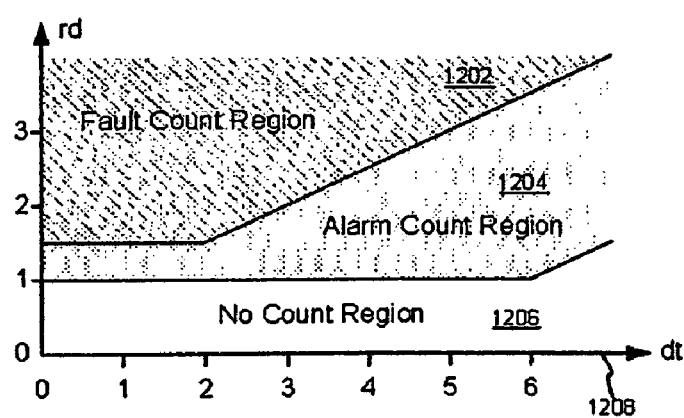
FIG. 11 is a diagram of the counting regions for the variable rd in FIG. 7 for the Trending and Memory block and the variable dt shown in FIG. 10 for the Decision Logic Counters in accordance with the present invention.

FIG. 11 shows an entire dt-rd plane 1200, which is divided into three regions: a fault count region 1202, an alarm count region 1204 and a no count region 1206. In this example, the dt axis 1208 has units of 2-cycles. For example, a value of 30 represents 30 2-cycle periods, or one second for 60 Hz power systems. If {rd,dt} pair falls in the no count region 1206, no number of counts are generated for alarm and fault in the decision logic 1100. If {rd,dt} pair falls in the alarm count region 1204, only counts are generated for HIF alarm. If {rd,dt} pair falls in the fault count region 1202, counts are generated for both HIF fault and alarm.

Figure 12:
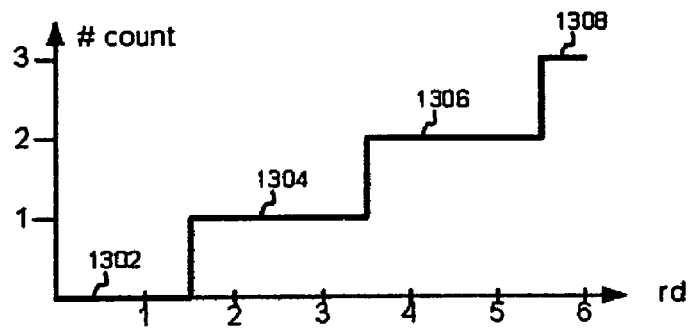
FIG. 12 is a diagram illustrating how the number of counts is generated as a function of the ratio, rd, in accordance with the present invention.

FIG. 12 shows a graphical representation of how the number of counts is generated as a function of the ratio, rd, for each {rd,dt} pair that is determined to be countable in the plane 1200 of FIG. 11. For example, if the rd value in a {rd,dt} pair is 4, and the pair falls in the fault count region 1202, then two counts are generated for this pair of {rd,dt}. Further, if the {rd,dt} pair is the only occurrence in a one-second segment, then the total of two counts is used in the operations of comparators 1112 and 1114 of the decision logic 1100. If comparator 1112 has a threshold of 3 ($q_1$=3) in the above example, the output of comparator 1112 will be a logic 0 and no accumulation is added to counter 1116. On the other hand, if comparator 1114 has a threshold of 1 ($q_2$=1), the output of comparator 1114 will be a logic 1 and one count is accumulated into counter 1118.

Figure 13:
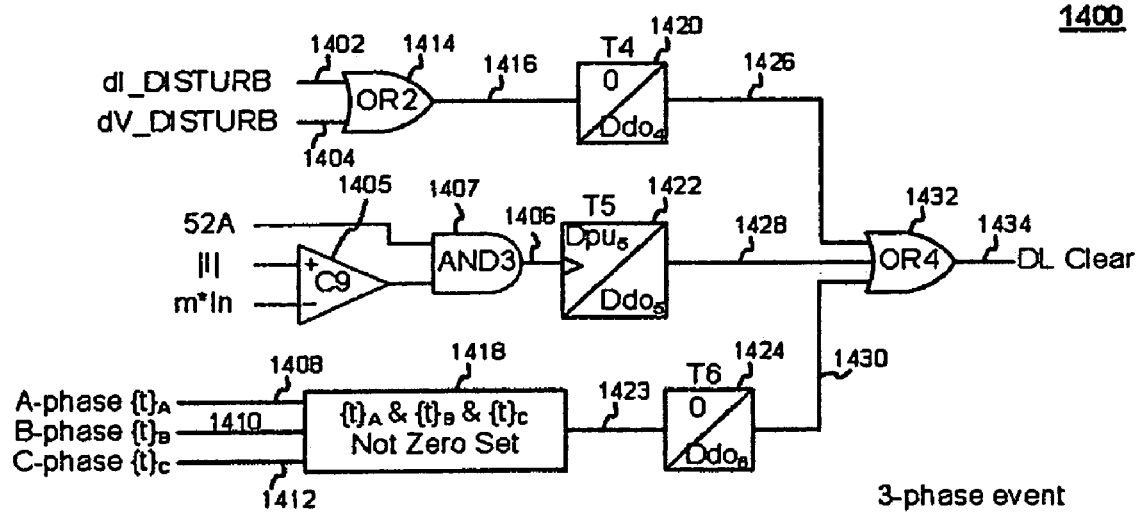
FIG. 13 is a schematic diagram illustrating the details of generating a clear condition for the Decision Logic block shown in FIG. 10 in accordance with the present invention.

FIG. 13 shows the enable logic 1400 for the adaptive tuning logic 900 in FIG. 8 for a three-phase distribution system. It will be noted that the logic 1400 is similar to the enable logic 1000 in FIG. 9. In particular, OR gate 1414, timer 1420, comparator 1405, AND gate 1407 and timer 1422 in FIG. 13 are similar to corresponding elements 1028, 1034, 1029, 1030 and 1036 in FIG. 9, respectively. However, the times from the A, B and C-phases are input on lines 1408, 1410 and 1412 to block 1418 to provide for three-phase monitoring in the enable logic 1400 of FIG. 13. In contrast, the enable logic 1000 of FIG. 9 is suited for single phase monitoring.

The enable logic 1400 in FIG. 13 determines three-phase event conditions. The input $\{t\}_A$ on line 1408 represents the set of time incidences that the A-phase SDI difference is above the tuned threshold within the previous second, the input $\{t\}_B$ on line 1410 represents the set of time incidences that the B-phase SDI difference is above the tuned threshold within the previous second, and the input $\{t\}_C$ on line 1412 represents the set of time incidences that the C-phase SDI difference is above the tuned threshold within the previous second. Function block 1418 then determines if there are common values from the $\{t\}_A$, $\{t\}_B$ and $\{t\}_C$ inputs. If at least one common non-zero value is detected, the input on line 1423 to a timer 1424 changes state, such as to a logic 1. The output 1430 of timer 1424 then changes state for a predetermined time, such as for $Ddo_6$ seconds, to block the decision logic.

Figure 14:
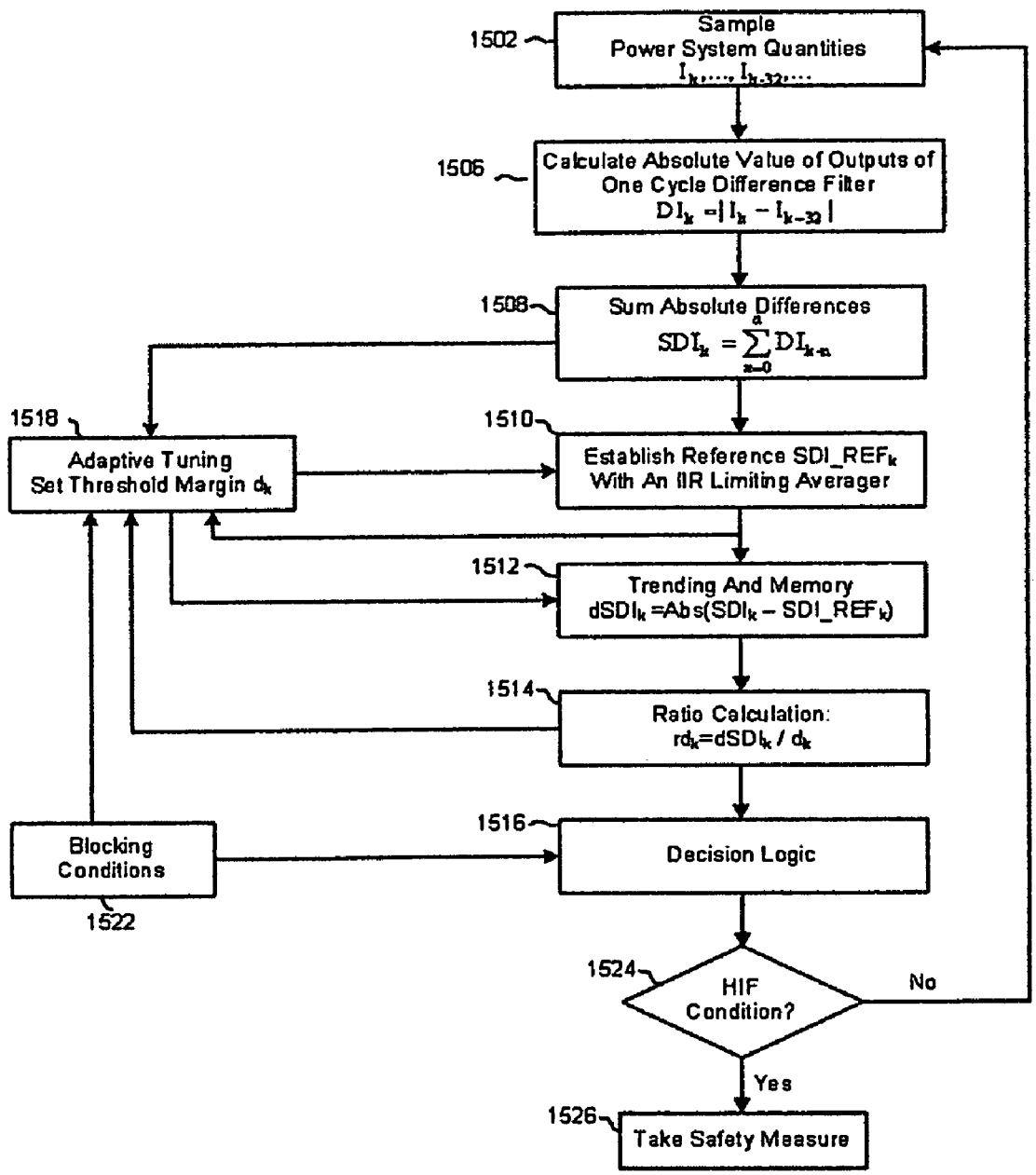
FIG. 14 is a flowchart illustrating the methods employed in detecting an HIF in a multi-grounded distribution system in accordance with the present invention.

FIG. 14 illustrates an embodiment of a method of detecting high-impedance faults in a multi-grounded distribution system. At block 1502, the power system quantities $I_K$, . . . , $I_{K-32}$, . . . are sampled. Block 1506 receives these power system quantities from block 1502 and calculates the absolute values of one-cycle difference filter, $DI_k=|I_k-I_{k-3\ 2}|$. Block 1508 receives the absolute values of one-cycle difference filter from block 1506 and calculates the sum of absolute differences, such as in accordance with the equation $$SDI_k = \sum_{n=0}^{63} DI_{k-n}.$$

These results are supplied to the adaptive tuning and set threshold margin block 1518. Block 1510 receives the margin, $d_K$, from block 1518, and the sum of absolute difference from block 1508 and establishes a reference, $SDI\_REF_K$, with an IIR limiting averager. This reference is also supplied to the adaptive tuning and set threshold margin block 1518. Block 1512 receives the margin $d_K$ from block 1518 and the reference, $SDI\_REF_K$, from block 1510. It then determines the trending and memory value $dSDI_K=ABS(SDI_K-SDI\_REF_K)$. The ratio, $rd_K=dSDI_K/d_K$, is determined at block 1514 and this ratio is supplied to the adaptive tuning and set threshold margin block 1518 and to the decision logic at block 1516. Adaptive tuning 1518 also receives the ratio rdk from block 1514. Blocking conditions at block 1522 are provided to the decision logic at block 1516 and to the adaptive tuning and set threshold margin block 1518. The decision logic at block 1516 then sets counters, defines fault count/no-count regions and alarm count/no-count regions. Block 1524 then receives information from decision logic block 1524 and determines if an HIF condition exists. If so, block 1526 is informed to take a safety measure. If not, the method returns to block 1502 to continue monitoring for an HIF.

Figure 15A:
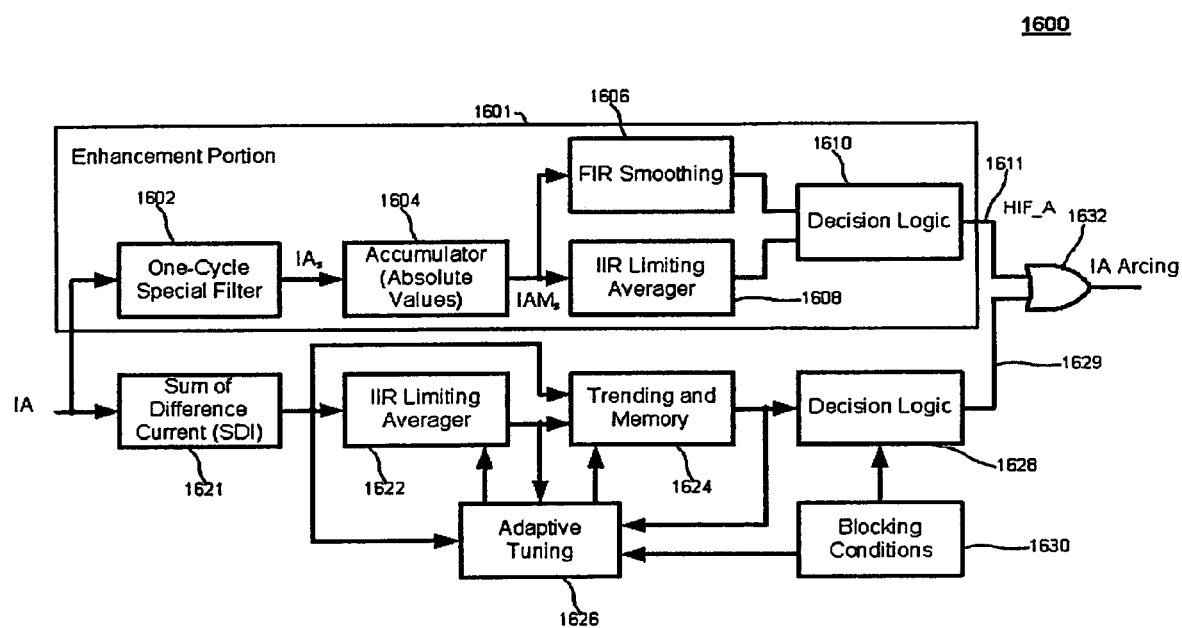
FIG. 15A illustrates a block diagram of an alternate embodiment of the HIF detector shown in FIG. 2 for one of the phases of the electrical power distribution system, such as for the A-phase, in accordance with the present invention.
Figure 15B:
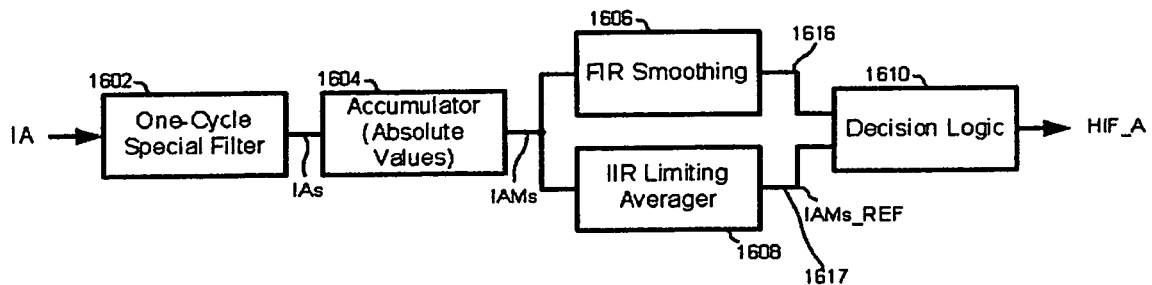
FIG. 15B illustrates a block diagram for an enhancement portion of the alternate embodiment of the HIF detector shown in FIG. 15A in accordance with the present invention.
Figure 15C:
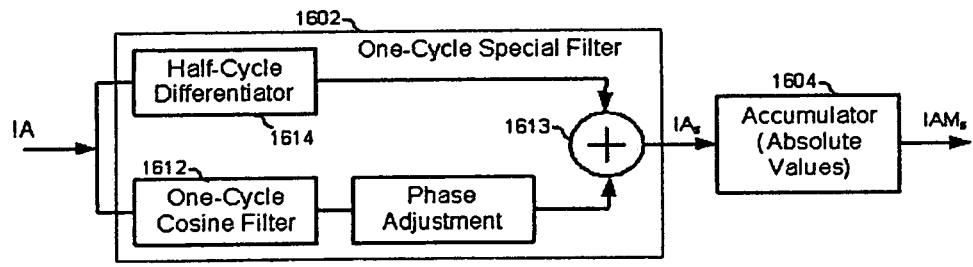
FIG. 15C illustrates a block diagram for a one-cycle special filter of the alternate embodiment of the HIF detector shown in FIG. 15A and for the enhancement portion shown in FIG. 15B, in accordance with the present invention.

FIG. 15A illustrates an alternative embodiment 1600 of a system or method for determining an HIF condition, as compared to the preferred embodiment 200 shown in FIG. 2. In this embodiment, the blocks of the lower level correspond to the blocks of FIG. 2, namely: 1) the Sum of Difference Current (SDI) 1621 corresponds to the Sum of Difference Current (SDI) 300, 2) IIR Limiting Averager 1622 corresponds to IIR Limiting Averager 600, 3) Trending and Memory 1624 corresponds to Trending and Memory 800, 4) Adaptive Tuning 1626 corresponds to Adaptive Tuning 900, 5) Blocking Conditions 1630 corresponds to Blocking Conditions 1700 and 6) Decision Logic 1628 corresponds to Decision Logic 1100. In particular, an enhancement portion 1601 (see FIG. 15B) has been added to the blocks shown in FIG. 2. FIG. 15B shows the enhancement portion 1601 separately from the more detailed embodiment shown in FIG. 15A. It will be appreciated that the enhancement portion 1601 provides a separate HIF output HIF_A on line 1611, which may be combined by a gate 1632 with the output on line 1629 from the preferred embodiment 200 shown in FIG. 2. The first element in the enhancement portion 1601 is a one-cycle special filter 1602, which is shown in greater detail in FIG. 16C. The output lAs of special filter 1602 is formed by summing the outputs of two parallel filters 1612 and 1614. The first filter is a one-cycle cosine filter 1612 plus a phase adjustment and the second filter is a half-cycle differentiator 1614. Thus, power system quantities are filtered by each filter 1612 and 1614 separately and then summed by a summer to provide output IA$_s$. Those skilled in the art can also combine two filters together and from a one-cycle FIR filter. Output IA$_s$ of special filter 1602 thus contains frequency contents of a signal around all odd harmonics in the pass band. The accumulator 1604 accumulates the absolute values of output IA$_s$. The output IAM$_s$ of accumulator 1604 may be defined by the following equation $$IAM_s = \sum_{Ns-cycles} |IA_s|$$

where the accumulating time is for Ns seconds. For example, Ns may have a range of one cycle to tens of cycles.

The finite impulse response (FIR) smoothing block 1606 calculates an average of the output IAM$_s$ from accumulator 1604 to smooth out the random changes of the signal content. The infinite impulse response (IIR) limiting averager 1608 may be similar in function to the previously described IIR limiting averager 600 shown in FIG. 5. The IIR limiting averager 1608 provides a long-term reference for the signal contents from the one-cycle special filter 1602. In order to make this reference stable in case of sporadic large excursions of input, the output of IIR limiting averager may be limited in accordance with the following equation $$IAMs\_REF_k = \begin{matrix} (1-\alpha) \cdot IAMs_k + \\ \alpha \cdot IAMs\_REF_{k-1} \end{matrix} \text{ if } IAMs_k < 2 \cdot IAMs\_REF_{k-1}$$
$$= (2-\alpha) \cdot IAMs\_REF_{k-1} \text{ otherwise}$$

where $q_{IIR2}$ is a constant greater than one. IAMs_REF is the output of the IIR limiting averager 1608 and IAMs is the input to the IIR limiting averager 1608. The subscript k represents a value of a variable at the specific time instant k. The subscript k−1 represents a value of a variable at time instant k−1, which is one processing instance older than time instant k. The FIR smoothing function 1606 smoothes the signal content to a smoothed signal quantity on its output line 1616. This smoothed signal quantity on line 1616 and the IAMs_REF signal on output line 1617 of the IIR limiting averager are both routed to the decision logic 1610.

Figure 15D:
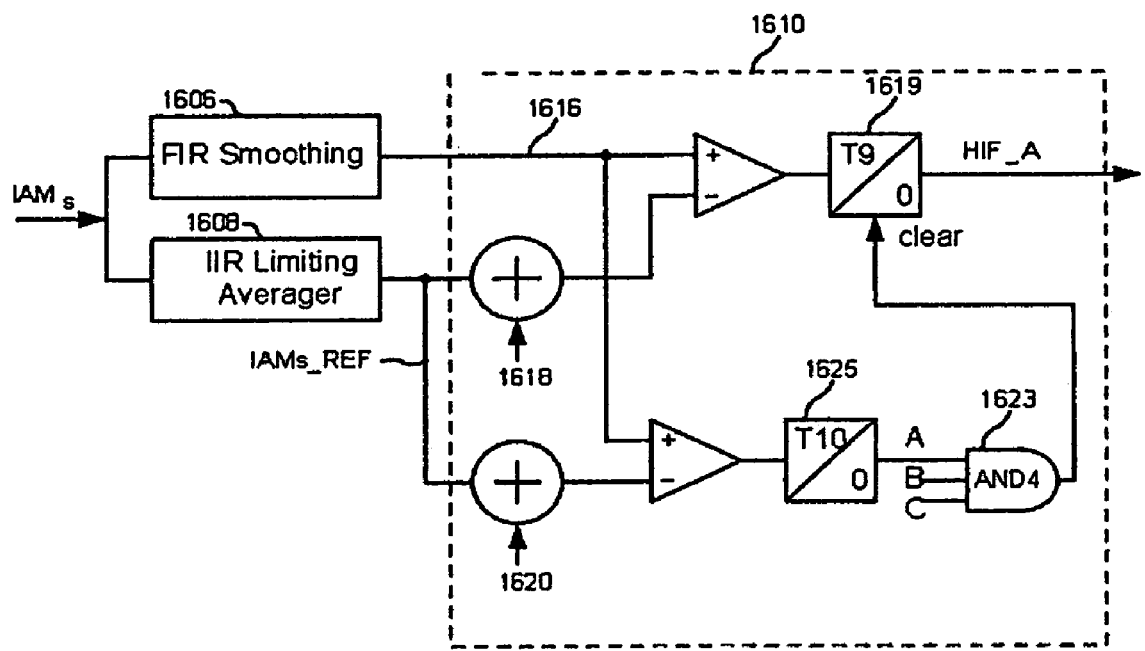
FIG. 15D illustrates a block diagram for further details of the decision logic in the alternate embodiment of the HIF detector shown in FIG. 15A and for the enhancement portion shown in FIG. 15B, in accordance with the present invention.

FIG. 15D illustrates an exemplary embodiment of the decision logic 1610. The decision logic 1610 compares the smoothed signal quantity from FIR smoothing 1606 and the IAMs_REF signal from IIR limiting averager 1608 with corresponding adaptive thresholds 1618 and 1620. If the smoothed signal quantity is above the corresponding adaptive threshold 1618 plus the signal IAMs_REF for a corresponding certain time period, as set by timer 1619, and if the output of an AND gate 1623 is a logic zero, then the decision logic 1610 outputs a logic one to signify the detection of an arcing high-impedance fault HIF on the monitored distribution feeder. As each distribution feeder carries different loads and therefore has a certain amount of ambient signal content, the thresholds 1618 and 1620 used in the decision logic are adaptive in nature and are derived in a similar manner to the previously described adaptive tuning 900 in FIG. 8. If the smoothed signal quantity on line 1616 is above the corresponding adaptive threshold 1620 plus the signal IAMs_REF for a corresponding certain time period, as set by timer 1625, and if this condition is true for all A, B and C three phases, then the output of AND gate 1623 is a logic one. A logic one output from AND gate 1623 represents system three-phase conditions other than a high-impedance fault, such as a distribution capacitor bank assertion. The logic one output of AND gate 1623 clears timer 1619 and thereby disables any high-impedance fault detection.

While particular embodiments of the invention have been shown and described, it will be obvious to those skilled in the art that changes and modifications may be made therein without departing from the invention in its broader aspects.

The invention claimed is:

1. A method for detecting a high-impedance fault in a multi-grounded electrical power distribution system using an intelligent electronic device, said method comprising the steps of:

for each cycle:
periodically sampling at least one distribution system quantity so that a plurality of samples are taken per cycle using an analog to digital converter, the plurality of samples including at least a first sample, a second sample, a third sample, and a fourth sample;
using said intelligent electronic device, calculating a plurality of differences for at least one distribution system quantity with a difference filter, wherein at least first, second, third and fourth differences are calculated wherein said first difference is calculated by calculating an absolute value of a difference of a first sample taken in a most recent cycle with a first sample taken in a previous cycle, and said second difference is calculated by calculating an absolute value of a difference of a second sample taken in the most recent cycle with a second sample taken in the previous cycle, and said third difference is calculated by calculating an absolute value of a difference of a third sample taken in the most recent cycle with a third sample taken in the previous cycle, and said fourth difference is calculated by calculating an absolute value of a difference of a fourth sample taken in the most recent cycle with a fourth sample taken in the previous cycle, wherein said differences collectively form a plurality of sequential differences within each cycle within said intelligent electronic device;
using said intelligent electronic device, calculating a sum of differences by summing each of the plurality of sequential differences including at least said first, second, third, and fourth differences, to produce a sum of differences during each cycle;
calculating a sum of differences by summing each of the plurality of sequential differences to produce a sum of differences during each cycle;
providing a trending with an output;
receiving the plurality of sum of differences, receiving the output of the trending, and generating a set threshold;
establishing a reference based upon the plurality of sum of differences and the set threshold;
using said intelligent electronic device, calculating a difference between the plurality of sum of differences and the reference;
forming a trend output if the difference exceeds the set threshold; and
determining existence of a high-impedance fault with decision logic based on the trend output.

2. The method for detecting a high-impedance fault in accordance with claim 1, said method comprising the additional step of:

deriving the at least one distribution system quantity samples from off harmonics, and any frequency contents in the system.

3. The method for detecting a high-impedance fault in accordance with claim 2, wherein the off harmonics include all non-integer multiples of a fundamental frequency in the system.

4. The method for detecting a high-impedance fault in accordance with claim 2, wherein the harmonics include even and odd harmonics in the system.

5. The method for detecting a high-impedance fault in accordance with claim 1, wherein the system comprises a three-phase power distribution system.

6. The method for detecting a high-impedance fault in accordance with claim 5, wherein the detection method is applicable to each of the three phases in the three-phase power distribution system.

7. The method for detecting a high-impedance fault in accordance with claim 1, further comprising the steps of:
   filtering to provide frequency contents of a signal around all odd harmonics for at least one power distribution system quantity;
   summing absolute values of frequency contents from the filtering step over a predetermined number of cycles;
   calculating an average of the sum of absolute values;
   establishing a reference based upon the sum of absolute values; and
   determining the existence of an arcing high-impedance fault based on the average of the sum of absolute values and the reference based upon the sum of absolute values.

8. The method for detecting a high-impedance fault in accordance with claim 7, further comprising the step of:
   adapting a decision logic threshold according to distribution feeder ambient conditions.

9. The method of claim 1, further comprising the step of calculating a ratio of the difference and the set threshold.

10. The method of claim 9, further comprising the step of determining the existence of a high-impedance fault with decision logic based on the ratio.

11. The method for detecting a high-impedance fault in accordance with claim 1, wherein said at least one power system quantity is current.

12. The method for detecting a high-impedance fault in accordance with claim 1, said method comprising the additional step of:
   calculating the sum of difference based on every two cycles.

13. The method for detecting a high-impedance fault in accordance with claim 1, wherein the cycle has thirty-two samples.

14. The method for detecting a high-impedance fault in accordance with claim 1, wherein said at least one distribution system quantity is energy.

15. The method for detecting a high-impedance fault in accordance with claim 1, wherein the step of generating a set threshold uses an adaptive tuning algorithm that tunes out feeder ambient characteristics in the system.

16. The method for detecting a high-impedance fault in accordance with claim 1, wherein the step of establishing a reference based upon the plurality of sum of differences and the set threshold is performed by an infinite-impulse-response averager, said infinite-impulse-response averager limiting its output and/or changes its time constant according to its input and other conditions.

17. The method for detecting a high-impedance fault in accordance with claim 1, wherein the step of calculating a sum of differences is performed using a one-cycle difference filter.

18. The method for detecting a high-impedance fault in accordance with claim 1, further comprising the step of providing a set of predetermined blocking conditions, and wherein the step of determining existence of a high-impedance fault comprises based on the set of predetermined blocking conditions.

19. Apparatus for detecting a high-impedance fault in a multi-grounded electrical power distribution system, said apparatus comprising:
   a sum of difference filter for calculating a plurality of sum of differences for at least one power distribution system quantity;
   a trending with an output;
   an adaptive tuning algorithm for receiving the plurality of sum of differences from the sum of difference filter, for receiving the output of the trending and for generating a set threshold;
   an infinite-impulse-response averager for establishing a reference based upon the plurality of sum of differences from the sum of difference filter and the set threshold from the adaptive tuning algorithm;
   said trending for calculating
      the difference between the plurality of sum of differences from the sum of difference filter and the reference from the infinite-impulse-response averager, and,
      for forming a trend output if the difference exceeds the set threshold from the adaptive tuning algorithm; and
   a decision logic for determining an existence of a high-impedance fault based on the trend output from the trending.

20. The apparatus for detecting a high-impedance fault in accordance with claim 19, wherein the plurality of power system quantities samples from any off harmonics, and any frequency contents in the system.

21. The apparatus for detecting a high-impedance fault in accordance with claim 20, wherein the off harmonics include all non-integer multiples of a fundamental frequency in the system.

22. The apparatus for detecting a high-impedance fault in accordance with claim 20, wherein the harmonics include even and odd harmonics in the system.

23. The apparatus for detecting a high-impedance fault in accordance with claim 19, said power distribution system comprising a three-phase power distribution system.

24. The apparatus for detecting a high-impedance fault in accordance with claim 23, wherein said apparatus is applicable to each of the three phases in the three-phase power distribution system.

25. The apparatus for detecting a high-impedance fault in accordance with claim 19, further comprising:
   a filter to provide frequency contents of a signal around all odd harmonics for at least one power distribution system quantity;
   an accumulator for summing absolute values of frequency contents from the filter over a predetermined number of cycles;
   a finite impulse response smoothing calculator for calculating an average of the sum of absolute values from the accumulator;
   a second infinite impulse response limiting averager for establishing a reference based upon the sum of absolute values from the accumulator; and a second decision logic for determining the existence of an arcing high-impedance fault based on the average of the sum of absolute values from the finite impulse response smoothing calculator and the reference from the second infinite impulse response limiting averager.

26. The apparatus for detecting a high-impedance fault in accordance with claim 25, further comprising:
decision logic thresholds for adapting to the ambient operating conditions of a distribution feeder.

27. The apparatus of claim 19, wherein the trending is further for calculating a ratio of the difference and the set threshold.

28. The apparatus of claim 27, wherein the decision logic is further for determining an existence of a high-impedance fault based on the ratio.

29. The apparatus for detecting a high-impedance fault in accordance with claim 19, wherein said at least one power distribution system quantity is current.

30. The apparatus for detecting a high-impedance fault in accordance with claim 19, wherein the sum of differences is calculated based on every two cycles.

31. The apparatus for detecting a high-impedance fault in accordance with claim 19, wherein the sum of differences is calculated based on any sample point within a cycle.

32. The apparatus for detecting a high-impedance fault in accordance with claim 19, wherein the cycle includes thirty-two samples.

33. The apparatus for detecting a high-impedance fault in accordance with claim 19, wherein said at least one power system quantity is energy.

34. The apparatus for detecting a high-impedance fault in accordance with claim 19, wherein the adaptive tuning algorithm tunes out any feeder ambient characteristics in the system.

35. The apparatus for detecting a high-impedance fault in accordance with claim 19, said infinite-impulse-response averager limits its output and/or changes its time constant according to its input and other conditions.

36. The apparatus for detecting a high-impedance fault in accordance with claim 19, wherein the sum of difference filter is a one-cycle difference filter.

37. The apparatus for detecting a high-impedance fault in accordance with claim 19, further comprising a set of predetermined blocking conditions, and wherein the decision logic determines the existence of a high-impedance fault based on the trend output from the trending and the set of predetermined blocking conditions.

* * * * *